(12) United States Patent
Horiuchi et al.

(10) Patent No.: US 6,410,184 B1
(45) Date of Patent: Jun. 25, 2002

(54) POWER SOURCE CONTAINING RECHARGEABLE BATTERIES

(75) Inventors: Tatsuhito Horiuchi, Sumoto; Yoshiharu Takasaki, Ibi-Gun, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/492,184

(22) Filed: Jan. 27, 2000

(30) Foreign Application Priority Data

Jan. 28, 1999 (JP) .......................................... 11-019619
Jan. 29, 1999 (JP) .......................................... 11-022324
Jan. 29, 1999 (JP) .......................................... 11-023201

(51) Int. Cl.[7] .................. H01M 6/42; H01M 6/46; H01M 2/00; H01M 1/00; H01M 1/01; H02B 1/00; H02B 1/01

(52) U.S. Cl. .................. 429/156; 429/62; 429/149; 429/151; 429/153; 429/163; 429/159; 361/601; 361/830

(58) Field of Search .................. 429/149, 151, 429/153, 62, 163, 156, 159; 361/601, 728, 830

(56) References Cited

U.S. PATENT DOCUMENTS

| 4,190,702 A | 2/1980 | Pun et al. ........................ 429/4 |
| 4,443,523 A | 4/1984 | Hasenauer ................... 429/99 |
| 5,866,276 A | 2/1999 | Ogami et al. |

FOREIGN PATENT DOCUMENTS

| EP | 0 892 450 | 1/1999 |
| JP | 10-270006 | 10/1998 |
| JP | 11-45691 | 2/1999 |

*Primary Examiner*—Stephan Kalafut
*Assistant Examiner*—Julian A Mercado
(74) *Attorney, Agent, or Firm*—Wenderoth, Lind & Ponack, L.L.P.

(57) ABSTRACT

The power source holds a plurality of parallel oriented power modules in a holder-case. The holder-case is provided with cover-casings on both sides and intermediate-casings between them. Holder ribs project from the insides of cover-casings and from both sides of intermediate-casings for arranging power modules in a plurality of rows and retaining them in fixed positions. Cover-casings on both sides and intermediate-casings are joined to sandwich and hold the plurality of rows of power modules in fixed positions via the holder ribs.

36 Claims, 21 Drawing Sheets

POWER SOURCE CONTAINING RECHARGEABLE BATTERIES

This application is based on Japanese Application No. 19619 filed on Jan. 28, 1999, Japanese Application No. 22324 filed on Jan. 29, 1999, and Japanese Application No. 23201 filed on Jan. 29, 1999, the contents of which are incorporated herein by reference.

BACKGROUND OF THE INVENTION

This invention relates to a high current power source used primarily to power a drive motor for automobiles such as hybrid and electric automobiles.

A high current power source used to power an automobile drive motor achieves high output voltage by series connection of many battery cells. This is for the purpose of increasing drive motor output. A power source used for this type of application contains a large number of battery cells to increase output electrical power. For example, this type of power source is cited in Japanese Non-examined Patent Publication HEI 10-270006 (1998). As shown in the exploded oblique view of FIG. 1, the power source disclosed in this patent application is provided with a holder-case 135 to house power modules in a plurality of rows. The holder-case 135 is formed of plastic in a box-shape with an open rectangular top. The holder-case 135 has circular through-holes 135a in both end walls 135A for insertion of long, slender circular columns of power modules. Further, intermediate, walls 135B are provided parallel to the end walls 135A to retain power modules in a stable manner, and these intermediate walls 135B also have circular through-holes 135b. Power modules are inserted through the holes 135a in both, end walls 135A and through the holes 136b in the intermediate walls 135B to retain the power modules in fixed positions within the holder-case 135.

This type of holder-case can reliably retain a plurality of power modules inserted into the through-holes. However, this type of holder-case has the drawback that its manufacture is markedly troublesome and manufacturing cost is high. This is because through-holes are formed for power module insertion and retention in both end walls and intermediate walls. Formation of a holder-case provided with through-holes in both end walls and intermediate walls requires a mold with a complex configuration. This is because regions of end wall and intermediate wall through-hole formations cannot be easily ejected from the mold.

In addition, through-holes provided in both end walls and intermediate walls of this type of holder-case must be formed to accurately fit the outline of the power modules. If a through-hole is larger than a power module, the power module cannot be retained without gaps. If a through-hole is smaller than a power module, the power module cannot be inserted into the through-hole. Unfortunately, power modules cannot be fabricated with a highly precise outline. This is because a power module is made by fixing devices such as temperature sensors to circular cylindrical batteries and covering the assembly with heat-shrink tubing. There is some error in the outline shape of circular cylindrical batteries manufactured in quantity. Additional variation in the outside diameter of a power module results from fixture of devices such as temperature sensors to the surface of the circular cylindrical batteries and application of the heat-shrink tubing. Consequently, since power module outlines differ, even if end wall and intermediate wall through-holes are formed with precision, it is difficult to insert all power modules into through-holes without forming gaps, thereby compromising reliable retention.

It is necessary to form through-holes for retaining power modules of variable outside diameter to a size which allows insertion of the power module with the largest outside diameter. Therefore, when a power module of somewhat smaller outside diameter is inserted into a through-hole, a gap develops between the power module and the through-hole. This holder-case has the drawback that when gaps develop at end walls and intermediate walls, power modules cannot be retained in a stable manner without moving.

Still another problem is the extreme effort of inserting and setting power modules in a holder-case formed with through-holes equal in size to power module outside diameter. This, is because power modules cannot be smoothly inserted into small through-holes designed to tightly fit the power modules with no gaps. For this reason, it is extremely troublesome to assemble a power source unit by inserting numerous power modules into a holder case, and assembly cost become high. High assembly cost compounded with the high cost of holder-case manufacture have the drawback that total cost of the power source is exceptionally high.

Still further, since the holder-case shown in FIG. 1 is formed from plastic in a single piece, the number of power modules housed within the holder-case cannot be changed. To change the number of power modules, it is necessary to fabricate another special holder-case for that purpose. Using a holder-case of single-piece construction does not allow changing the number of power modules housed within the holder-case.

The present invention was developed to resolve these types of problems with prior art power sources. Thus it is a primary object of the present invention to provide a power source with a holder-case that can be efficiently and inexpensively manufactured in quantity, which can be simply, easily, and efficiently assembled, and which can reduce total cost. Another important object of the present invention is to provide a power source wherein power modules are installed In a holder-case without gaps, power modules are reliably retained in a holder-case, and the number of power modules housed within a holder-case of simple Structure can be changed.

The above and further objects and features of the invention will more fully be apparent from the following detailed description with accompanying drawings.

SUMMARY OF THE INVENTION

The power source of the present invention holds a plurality of power modules disposed in a parallel fashion within a holder-case. The holder-case is provided with cover-casings located on both sides and intermediate-casings between the cover-casings. Further, holder-ribs to retain power modules at fixed positions in a plurality of rows are established projecting from both sides of intermediate-casings and from inside surfaces of cover-casings. Both side cover-casings and an intermediate-casing are joined together to sandwich and retain a plurality of rows of power modules in fixed positions with the holder-ribs provided on the cover-casings and intermediate-casing.

This configuration of this power source has the characteristic that the holder-case can be efficiently and inexpensively manufactured in quantity, power source assembly is simple and easy, and total cost is reduced. The holder-case of this power source does not require making a holder-case mold of complex structure as in the prior art. Rather, the holder-case can be efficiently and inexpensively produced in quantity with molds of simple structure. Further, since holder-ribs on the cover-casings and intermediate-casings allow power modules to be lined up in fixed positions, assembly is extremely simple and can be performed in a short time. Therefore, both manufacturing cost and assembly cost can be reduced for the power source of the present invention, and it has the characteristic that total cost is markedly reduced.

Further, the cover-casings and intermediate-casing are joined together to sandwich, from both sides, power modules lined up in a plurality of rows to retain them in fixed positions. Therefore, in addition to extremely simple assembly, the power source described above has the characteristic that power modules can be installed and reliably retained within the holder-case without gaps.

Still further, the power source described above has the characteristic that the number of power modules housed using a holder-case of simple structure (few pieces of single-piece construction) can be changed. This is because the power source is configured with cover-casings on both sides and one or more intermediate-casing disposed between the cover-casings. A plurality of rows of power modules are sandwiched by, and held in fixed positions by joining together the cover-casings and intermediate-casings. The number of levels of power modules arranged in rows can be simply increased or decreased to change the number of power modules retained by changing the number of intermediate-casings. Consequently, there is no need to fabricate a special purpose holder-case to change the number of power modules retained, and this type of power source realizes the characteristic that the number of power modules retained can be changed in various ways, depending on the application, using a holder-case of simple structure (few pieces of single-piece construction).

In this type of holder-case, shock-absorbing gaskets are connected to some part or to the entire holder-ribs, and power modules are held between casings via the shock-absorbing gaskets.

DETAILED DESCRIPTION OF THE INVENTION

Figure 1:
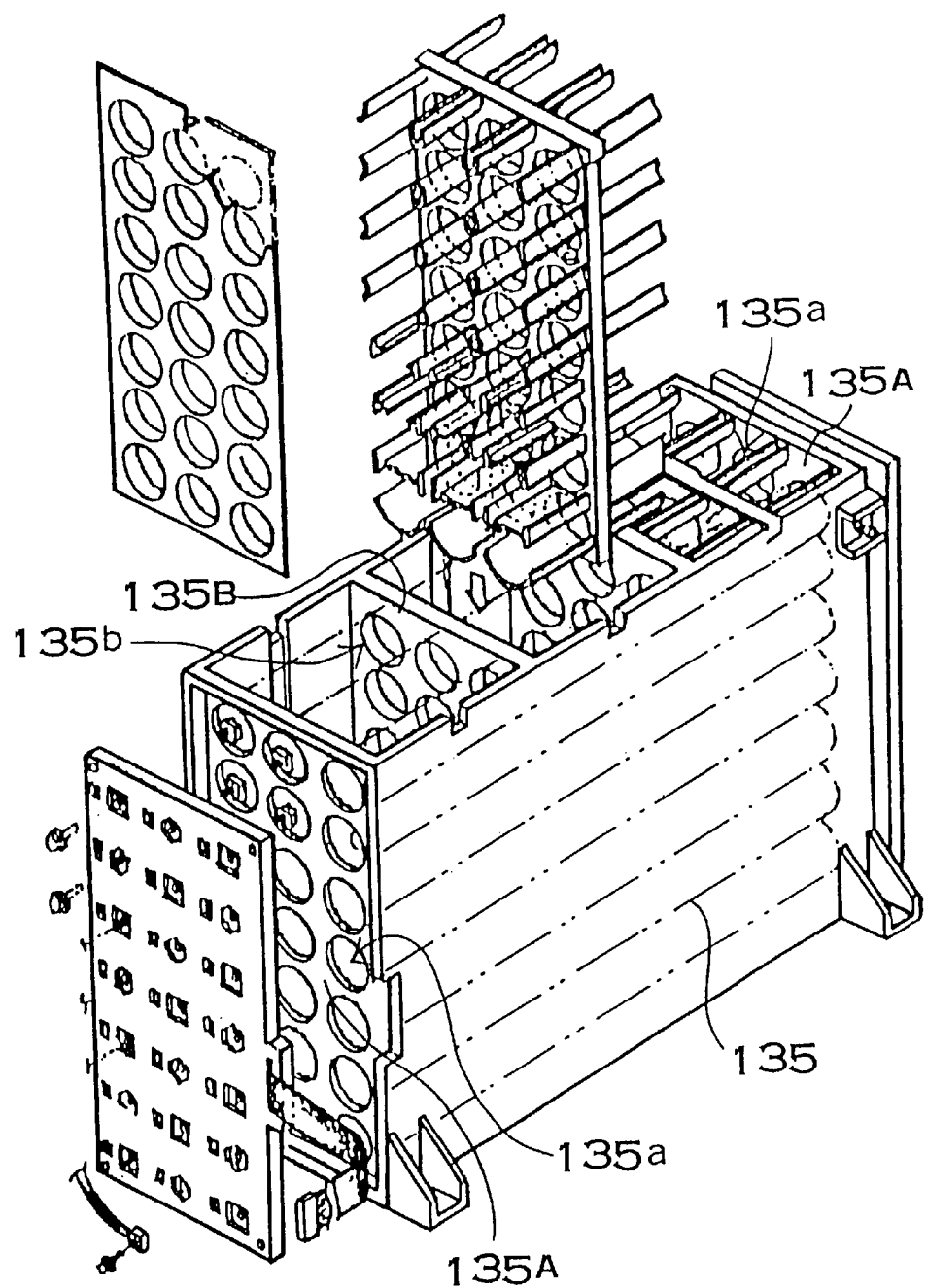
FIG. 1 is an exploded oblique view showing a prior art power source.
Figure 2:
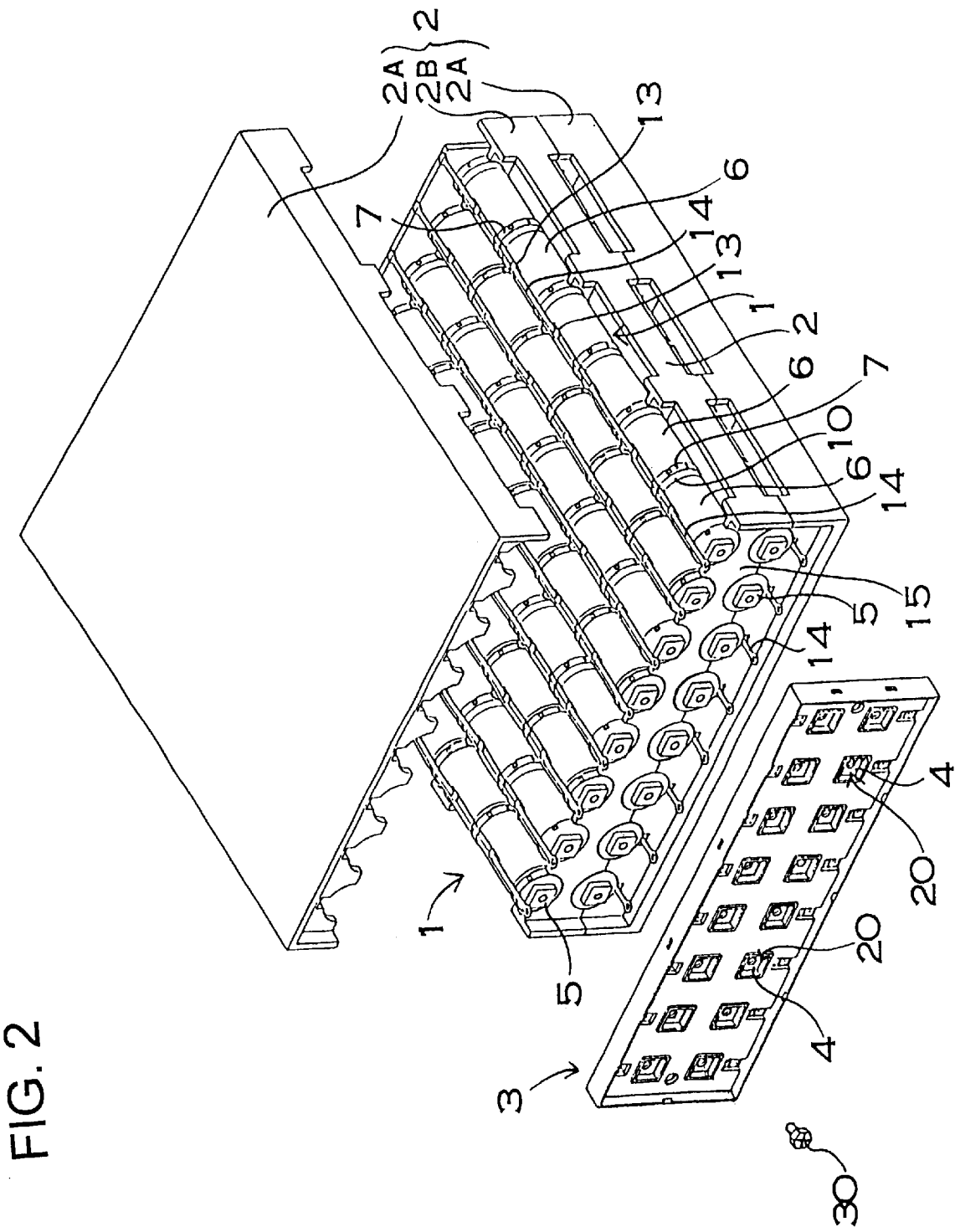
FIG. 2 is an exploded oblique view showing an embodiment of the power source of the present invention.

As shown in FIG. 2, the power source is provided with a holder-case 2 to hold a plurality of power modules 1 with parallel orientation, pass bars 4 located in end regions of the holder-case 2 and screw-fastened to electrode terminals 5 provided at the ends of the power modules 1 housed within the holder-case 2, and end-plates 3 attached at end regions of the holder-case 2 with pass bars 4 disposed in fixed positions.

A power module 1 has a plurality of rechargeable batteries or large capacitance super-capacitors joined in a linear fashion. The power modules 1 of FIG. 2 have six series connected rechargeable batteries 6 joined in a straight line. A power module using super-capacitors has a plurality of super-capacitors electrically connected in parallel. However, a power module may also be made up of a single rechargeable battery or super-capacitor. The power modules 1 shown in FIG. 2 have circular cylindrical rechargeable batteries 6 joined in a straight line by dish shaped connectors 7. Positive and negative electrode terminals 5 are connected at the ends of a power module 1.

Figure 3:
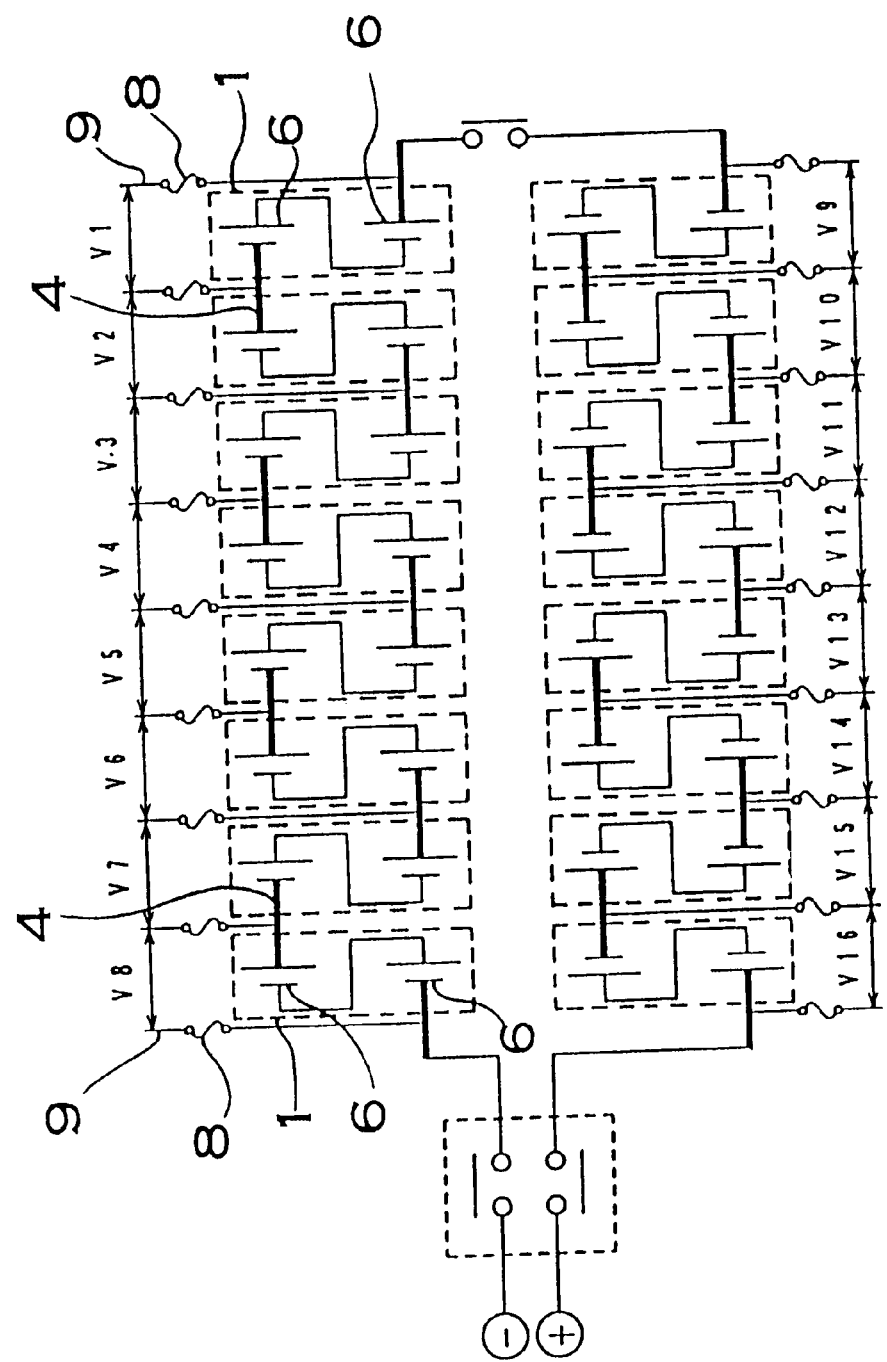
FIG. 3 is a circuit diagram showing an embodiment of the power source of the present invention.

Turning to FIG. 3, a circuit diagram of the power source shown in FIG. 2 is shown. The power source shown in FIG. 3 houses 2 levels of 8 rows of power modules 1, and each power module 1 is electrically connected in series. Pass bars 4, which connect power nodules 1, are connected via fuses 8 to leads 9 for measuring power module 1 voltage.

Figure 4:
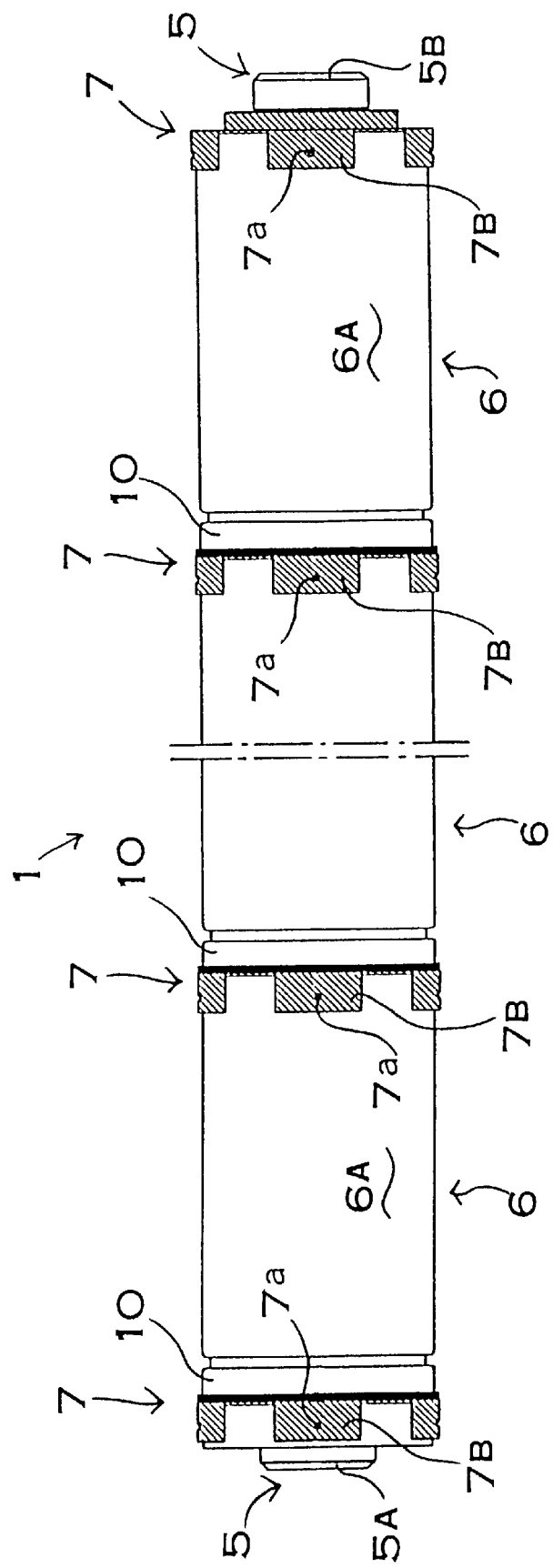
FIG. 4 is a side view of a power module housed within the power source shown in FIG. 2.
Figure 5:
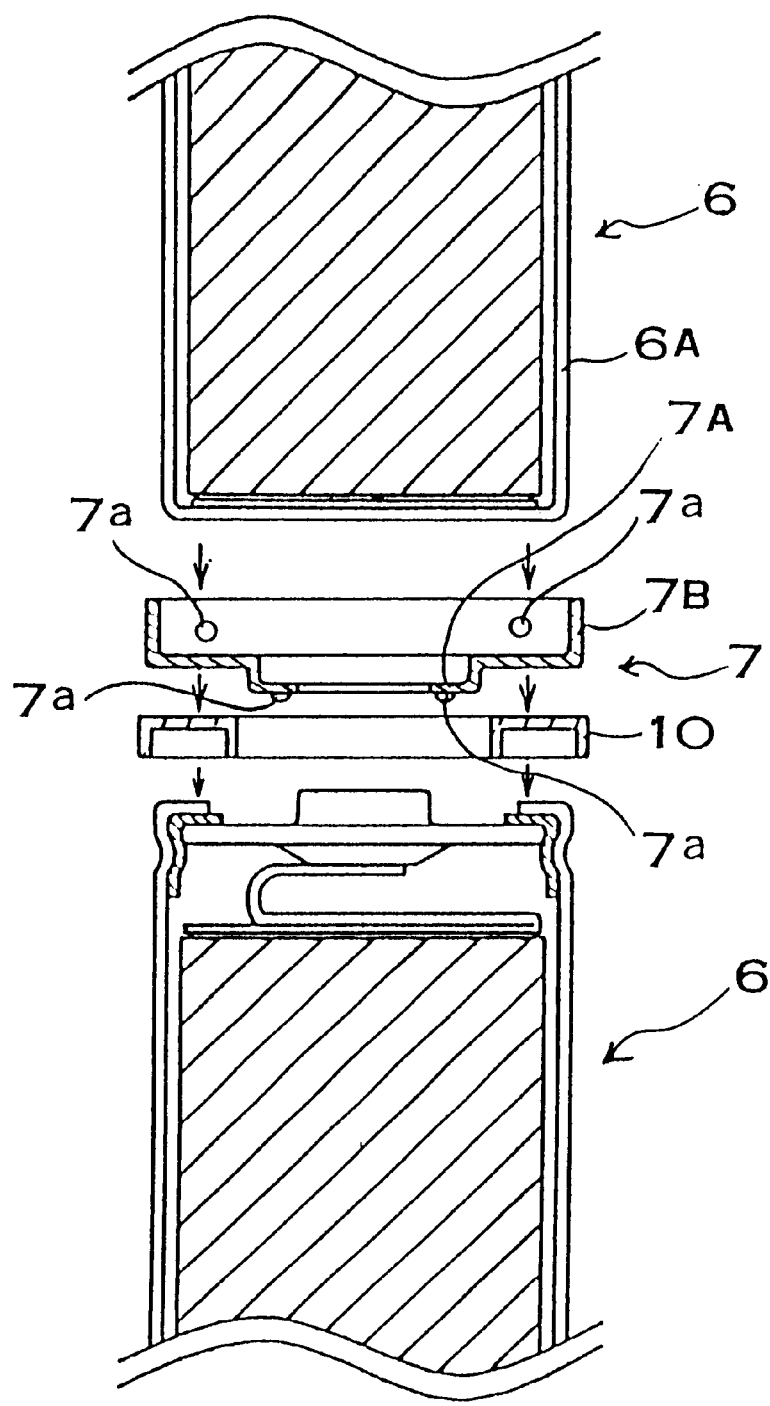
FIG. 5 is an exploded cross-section view showing the connecting structure for batteries of the power module shown in FIG. 4.

Turning to FIGS. 4 and 5, the structure for connecting batteries 6 in a straight line with dish-shaped connectors 7 is shown. In a power module 1 of this structure, a disk region 7A of a dish-shaped connector 7 is welded to the positive terminal of a circular cylindrical battery 6. The disk region 7A of the dish-shaped connector 7 is provided with projections 7a for welding to the positive terminal of the circular cylindrical battery 6. When the projections 7a of the dish-shaped connector 7 are welded to the positive terminal, welding electrode rods push on the top surfaces of the projections 7a. To prevent short circuits between the dish-shaped connector 7 and the circular cylindrical battery 6, a ring-shaped insulator 10 is sandwiched between the dish-shaped connector 7 and the circular cylindrical battery 6.

In addition, a circular cylindrical battery 6 is inserted into the dish-shaped connector 7 flange region 7B to connect the negative terminal of the circular cylindrical battery 6, which is its outer case 6A, with the flange region 7B. Similar to the disk region 7A, the flange region 7B also has projections 7a provided on its inner surface for welding to the battery outer case 6A. During welding, welding electrode rods push on the outsides of the flange region 7B projections 7a.

Figure 6:
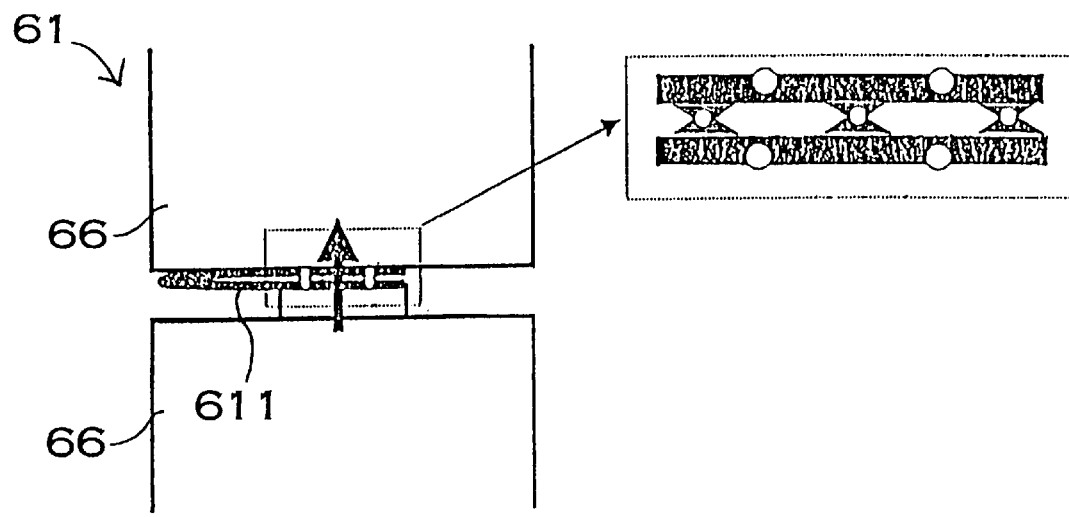
FIG. 6 is a cross-section view showing an example of another power module battery connecting structure.

As shown in the cross-sectional view of FIG. 6, series connected batteries can be joined without using dish-shaped connectors 7 by welding together to opposing sides of lead-plates 611, which have been bent in U-shapes. In the power module 61 of FIG. 6, opposing sides of U-shaped lead-plates 611 are welded by passing a high current pulse through batteries 66 in the direction of battery discharge. For example, lead-plates 611 can be welded by passing a high current pulse of 1 KA for approximately 15 msec.

Figure 7:
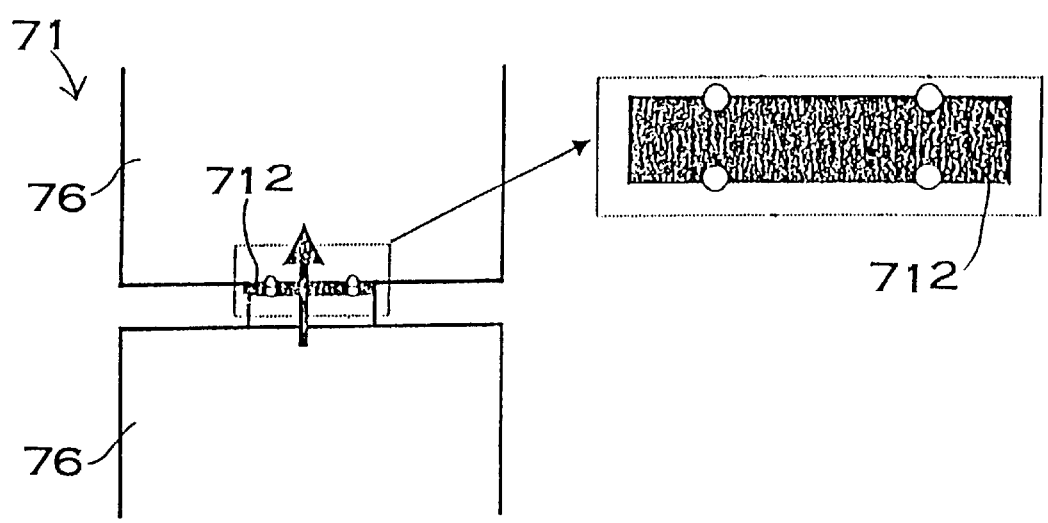
FIG. 7 is a cross-section view showing an example of another power module battery connecting structure.

Further, as shown in the cross-section of FIG. 7, metal plates 712 can be sandwiched between positive and negative battery 76 terminals, and a high current pulse can be passed through the batteries 76 in their direction of discharge to weld the metal plates 712 to the battery 76 terminals.

Figure 8:
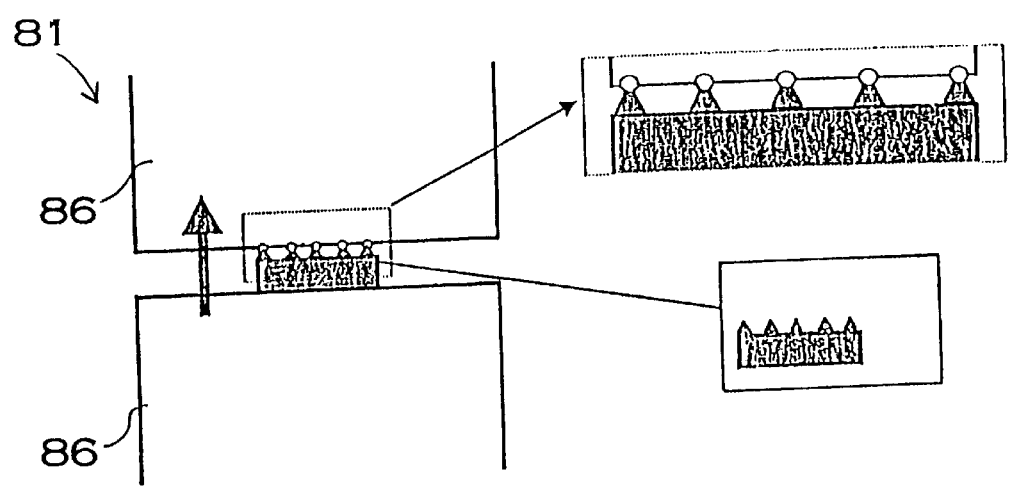
FIG. 8 is a cross-section view showing an example of another power module battery connecting structure.

Still further, as shown in FIG. 8, batteries 86, which are positive and negative terminals of a power module 81, can also be directly welded together with no intervening metal plate. Here, conical projections are provided on the upper surface of a battery sealing plate, which is the positive electrode terminal. These projections are welded to the negative electrode terminal of an adjacent battery 86 by passage of a high current pulse.

Power modules, as shown in FIGS. 6 through 8, with positive and negative battery terminals directly welded together without using dish-shaped connectors, or with metal plates welded together to positive and negative battery terminals, drastically reduce electrical resistance between batteries. These power modules also have the characteristic that the connected strength of the batteries can be increased.

Figure 9:
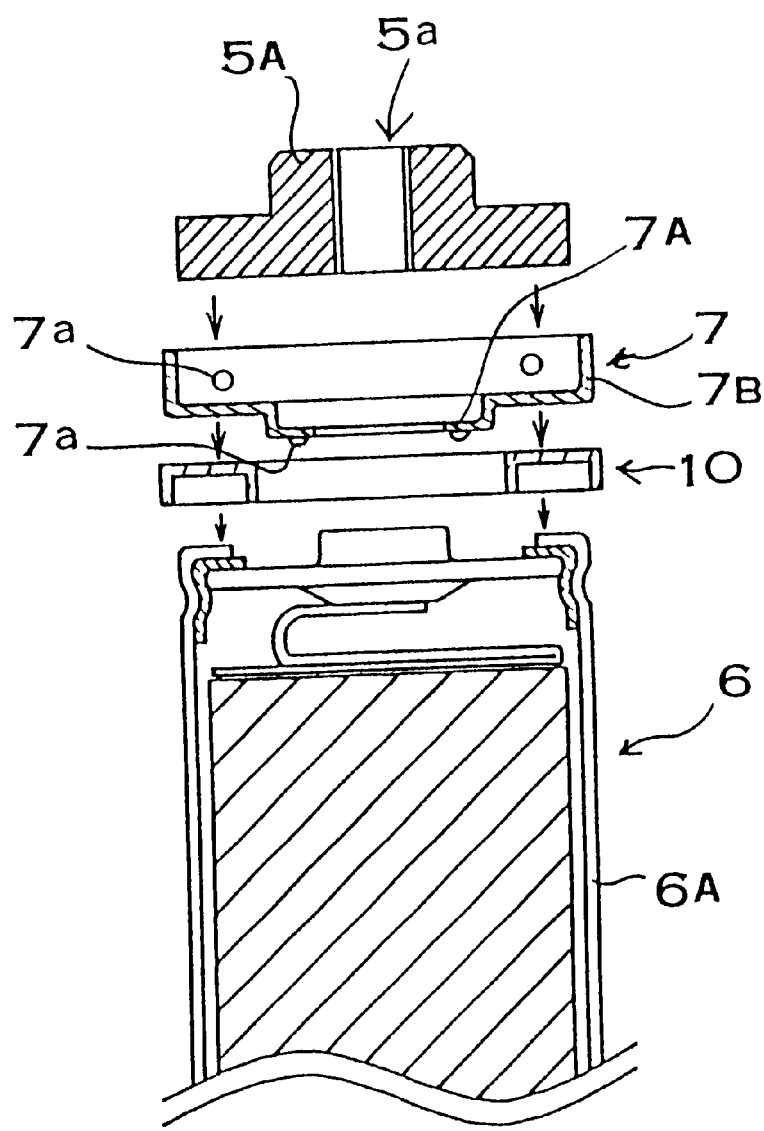
FIG. 9 is an exploded cross-section view showing the positive-side electrode terminal connecting structure for the power module shown in FIG. 4.
Figure 10:
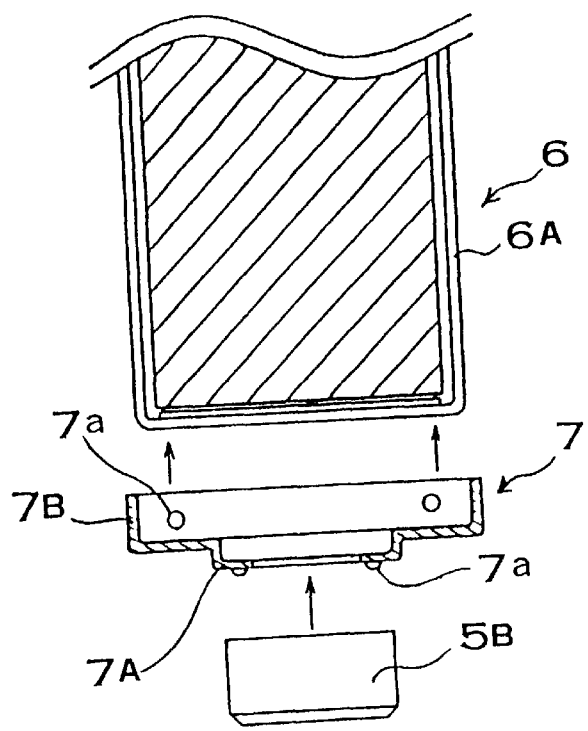
FIG. 10 is an exploded cross-section view showing the negative-side electrode terminal connecting Structure for the power module shown in FIG. 4.
Figure 11:
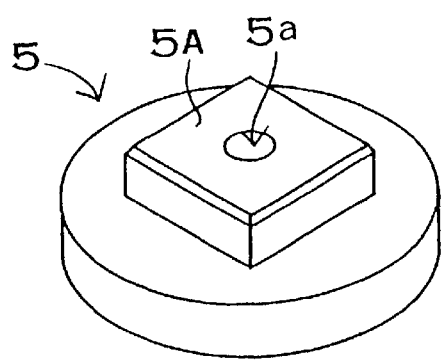
FIG. 11 is an enlarged oblique view of the positive electrode terminal shown in FIG. 9.
Figure 12:
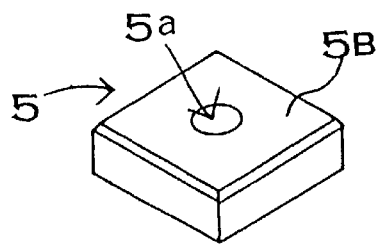
FIG. 12 is an enlarged oblique view of the negative electrode terminal shown in FIG. 10.

As shown in FIGS. 9 and 10, power modules, which are connected in series, have the positive side of the batteries 6 connected to a positive terminal 5A and the negative side connected to a negative terminal 5B. As shown in FIGS. 11 and 12, the central projection of the positive terminal 5A and the negative terminal 5B are formed in the shape of a square pillar. The purpose of the square pillar shape of the central projection of the positive terminal 5A and the negative terminal 5B is for alignment and connection of a plurality of power modules 1 into windows 20 opened in the end-plate 3. Threaded screw holes 5a are provided at the center of electrode terminals 5, namely the positive terminal 5A and the negative terminal 5B.

Rechargeable batteries 6 of the power modules 1 are nickel-hydrogen batteries. However, nickel-cadmium batteries or lithium-ion batteries may also be used as the rechargeable batteries of the power modules.

As shown in FIG. 2, temperature sensors 13 are fixed to the surface of each battery 6 of the power modules 1. The temperature sensors 13 are devices which can measure battery temperature. Preferably, PTC devices which change electrical resistance with battery temperature are used as temperature sensors 13. Temperature sensors 13 fixed to the surface of each battery 6 are connected linearly and in series via sensor leads 14, which extend along, and are fixed lengthwise to the surface of the power modules 1. Temperature sensors 13 and sensor leads 14 are attached to battery 6 surfaces by material such as heat-shrink tubing covering power module surfaces.

Figure 13:
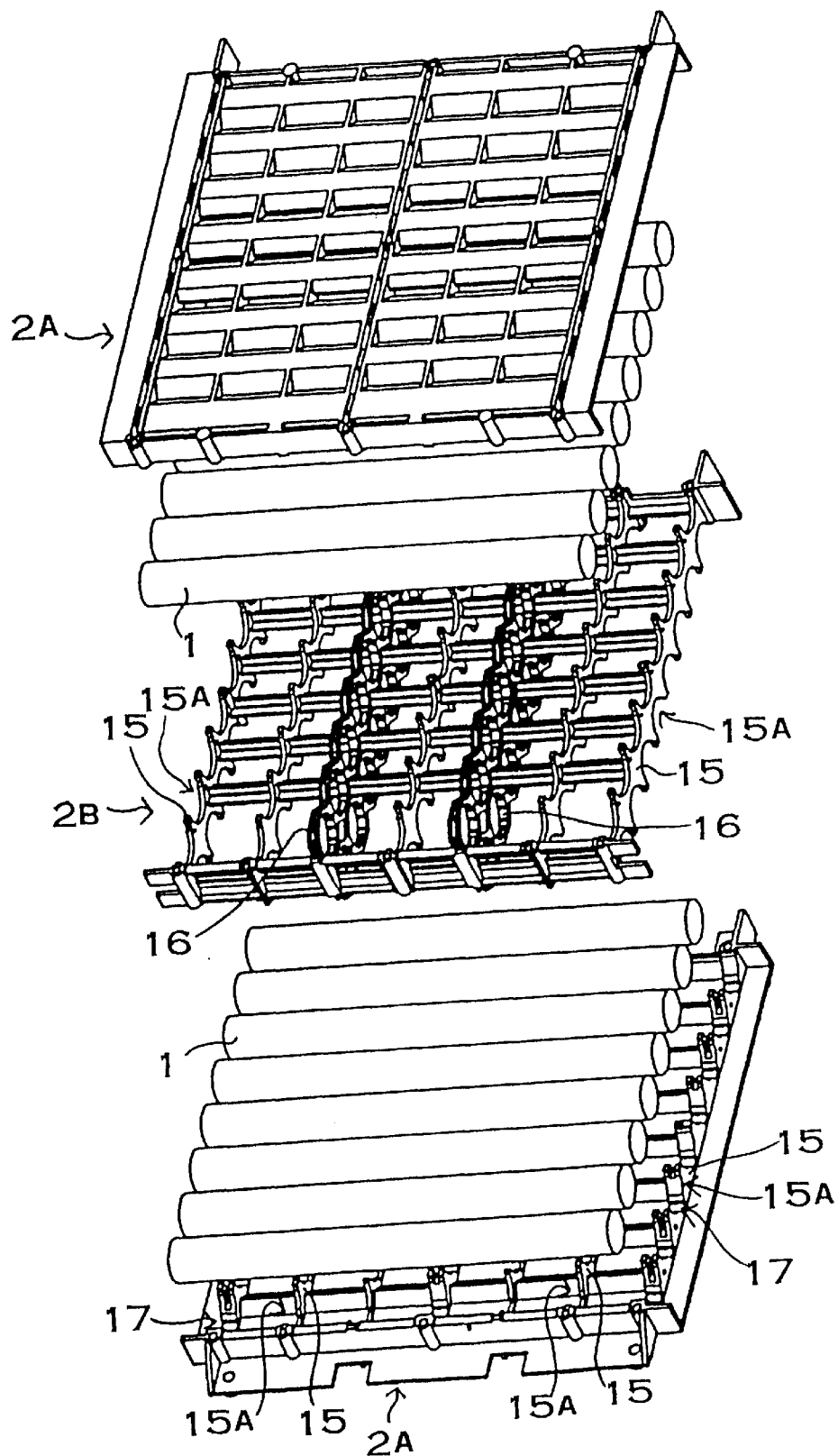
FIG. 13 is an exploded oblique view of the holder-case of the power source shown in FIG. 2.

Turning to the exploded oblique view of FIG. 13, the holder-case 2 is provided with cover-casings 2A shown on the top, a first cover, and bottom, a second cover, and an intermediate-casing 2B disposed between the top and bottom cover-casings 2A. The cover-casings 2A and the intermediate-casing 2B are formed entirely of plastic. Holder ribs 15 are formed as a single piece with the cover-casings 2A and the intermediate-casing 2B for the purpose of sandwiching and retaining power modules 1 in fixed positions. The cover-casings 2A and intermediate-casing 2B shown in FIG. 13 are provided with a plurality of parallel rows of holder ribs 15 at both ends and at intermediate positions. Holder ribs 15 are provided on the inside of cover-casings 2A and on both sides of intermediate-casing 2B. Holder ribs 15 are provided with retaining cavities 15A curved in half-circular shapes which follow power module 1 outlines to retain the circular cylindrical power modules in fixed positions. Holder rib 15 retaining cavities 15A are formed in shapes that conform to the surface of the power modules 1. Consequently, in the case of cylindrical polygon shaped power modules, the holder ribs 15 are formed into shapes conforming to cylindrical polygons.

Power modules 1 fit into holder rib 15 retaining cavities 15A, and are sandwiched and held in fixed positions. Flexible rubber shock-absorbing gaskets 16 are attached along holder ribs 15 retaining cavities 1 5A to improve battery 6 shock-resistance. The holder-case 2 of FIG. 13 has shock-absorbing gaskets 16 attached to 2 rows of intermediate holder ribs 15 and no shock-absorbing gaskets 16 attached to any of the other holder ribs 15, However, in the holder-case of the present invention, shock-absorbing gaskets may be attached to all holder ribs, to 1 row of holder ribs, or to 3 or more rows of holder ribs.

The shape of holder ribs 15 is changed slightly for those with shock-absorbing gaskets 16 attached, and for those without shock-absorbing gaskets attached. Holder ribs 15 with shock-absorbing gaskets 16 attached, are formed of lower height than holder ribs 15 without shock-absorbing gaskets 16 attached. This insures tight contact of the shock-absorbing gaskets 16, disposed between the holder ribs 15 and power modules, with the surfaces of the power modules. Holder ribs 15 without shock-absorbing gaskets 16 attached, are formed in shapes which cause the outer edges of the holder ribs 15 to contact or be in close proximity with power module surfaces when power modules 1 are sandwiched and retained by other holder ribs 15 with shock-absorbing gaskets 16 attached.

Figure 14:
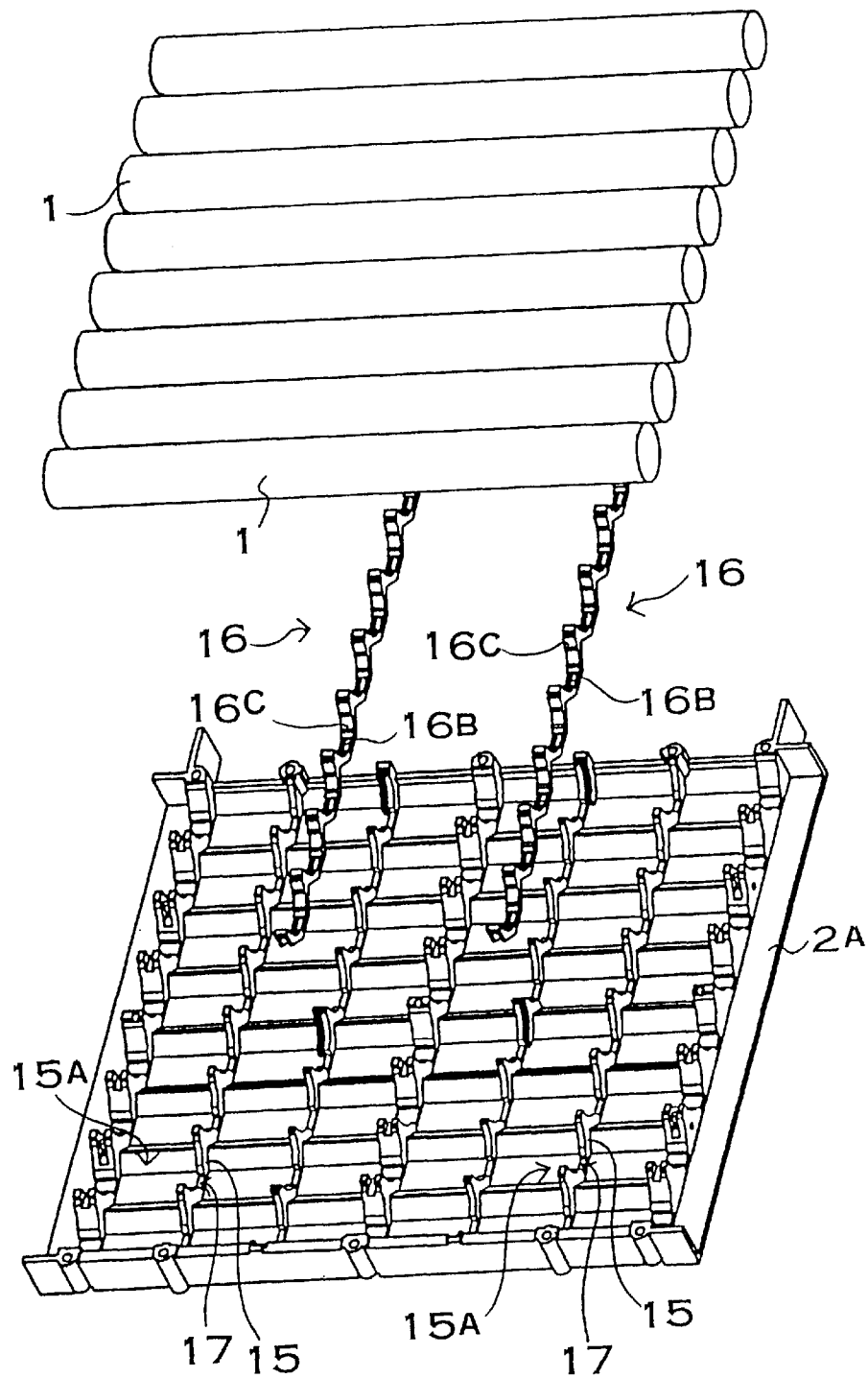
FIG. 14 is an exploded oblique view showing shock-absorbing gaskets installed on a cover-casing of the holder-case shown in FIG. 2.
Figure 15:
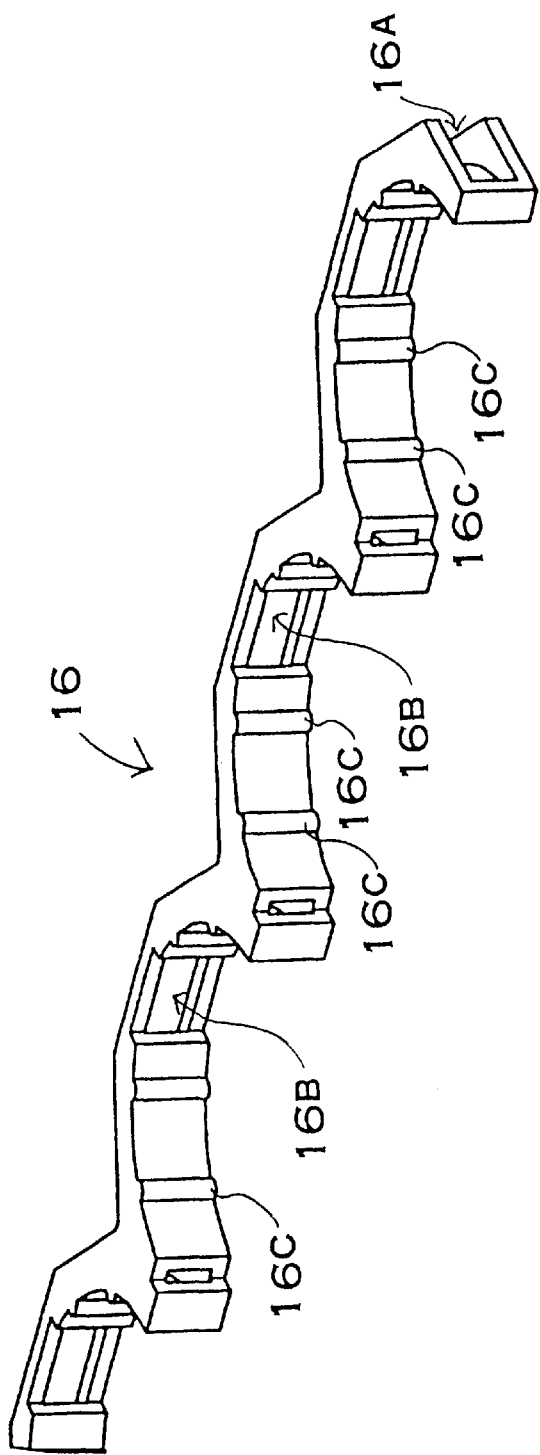
FIG. 15 is an enlarged oblique view of the shock-absorbing gaskets shown in FIG. 14.

As shown in FIGS. 14 and 15, shock-absorbing gaskets 16 are formed in shapes which conform to the holder ribs 15. Holder ribs 15 are provided with retaining cavities 15A for holding a plurality of rows of power modules 1, and holder rib outer edges are formed in wave-shapes with peaks and valleys. Shock-absorbing gaskets 16 are formed in wave-shapes to conform to the wave-shapes of the holder ribs 15 for attachment to those holder ribs 15. Wave-shaped shock-absorbing gaskets 16 follow the wave-shaped retaining cavities 15A to attach to the holder ribs 15.

In addition, shock-absorbing gaskets 16 are provided with attachment grooves 16A extending lengthwise to allow shock-absorbing gaskets 16 to fit simply and easily on the outer edges of holder ribs 15, and in a manner to prevent the shock-absorbing gasket 16 from slipping out of alignment when attached. The attachment grooves 16A of the shock-absorbing gaskets 16 fit to the outer edges of holder ribs 15, and attach in fixed positions on the holder ribs 15. Shock-absorbing gaskets 16 attached to holder ribs 15 in this manner can maintain fixed positions without gluing or bonding. However, it is needless to mention that shock-absorbing gaskets may be locally bonded and fixed to holder ribs.

Holder ribs 15 are provided with cut-outs 17 at the bottoms of the retaining cavities 15A for guiding temperature sensors 13 and sensor leads 14, which jut out from the surface of the power modules 1. Temperature sensors 13 and sensor leads 14 are inserted into the cut-outs 17 and power modules 1 are sandwiched in fixed positions via holder rib 15 retaining cavities 15A.

Shock-absorbing gaskets 16 are narrow and able to flexibly deform in regions connected with cut-outs 17 of holder rib 15. This is for the purpose of pressing shock-absorbing gaskets in contact with power module 1 projections to retain them in a stable fashion. The shock-absorbing gasket 16 shown in FIG. 15 is provided with slits 16B in regions which connect with cut-outs 17 of holder rib 15, and these regions are narrow and able to flexibly deform. The slits 16B connect with the attachment groove 16A and material located on both sides of a slit 16B is disposed in the manner of bridges across the cut-out 17.

In addition, the shock-absorbing gasket 16 shown in FIG. 15 is provided with local projections 16C which jut from the surfaces which contact and press against the power modules. The projections 16C are formed as protrusions extending parallel to the power modules 1. This shock-absorbing gasket 16 configuration has the characteristic that projections 16C tightly contact power modules 1 in local areas and retain the power modules 1 by pressing with a desired flexibility.

A holder-case 2 with the above structure is assembled as follows to retain power modules 1 disposed in parallel.

(1) Shock-absorbing gaskets 48 are attached to holder ribs 15 of the cover-casings 2A and intermediate-casing 2B. Shock-absorbing gaskets 16 can be easily attached by insertion of holder ribs 15 into attachment grooves 16A.

(2) The bottom cover-casing 2A is set horizontally and power modules 1 are lined up in a parallel fashion by insertion into holder rib 15 retaining cavities 15A. In the cover-casing 2A of the figures, 8 rows of power modules 1 are arranged in the holder ribs 15. Power modules 1 are lined up to arrange both ends in single planes. At this point, temperature sensors 13 and sensor leads 14 projecting from power module 1 surfaces guided through holder rib 15 cut-outs 17.

(3) The intermediate-casing 2B is placed on the bottom cover-casing 2A. The power modules 1 insert into the retaining cavities 15A of holder ribs 15 projecting from the bottom surface of the intermediate-casing 2B to align the layer.

(4) Power modules 1 are lined up in a parallel fashion by insertion into retaining cavities 15A in the holder ribs 15 projecting from the upper surface of the intermediate casing 2B. Again power modules 1 are lined up to arrange both ends in single planes.

(5) The top cover-casing 2A is placed over the power modules 1 aligning the top layer cover-casing 2A. In this configuration, power modules 1 are guided into the retaining cavities 15A of holder ribs 15 projecting from the bottom side of the cover-casing 2A.

(6) The top and bottom cover-casings 2A are joined with connecting screws (not illustrated) to connect and hold the top and bottom cover-casings 2A and intermediate-casing 20 together. Connecting screws pass through the top and bottom cover-casings 2A and intermediate-casing 2B to join them. Connecting screws join the top and bottom cover-casings 2A at the four corner regions and at Intermediate locations.

Figure 16:
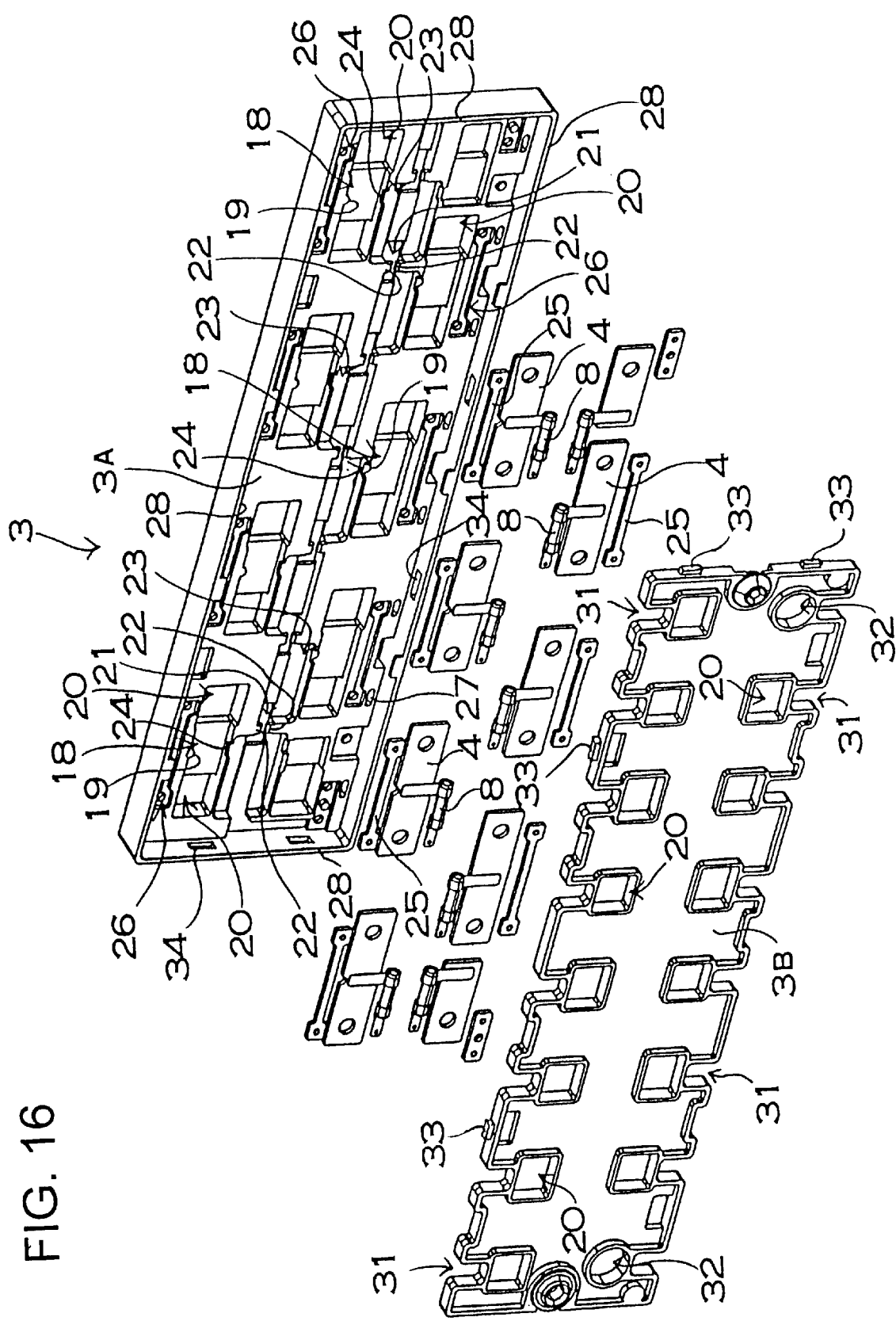
FIG. 16 is an exploded oblique view of an end-plate of the power source shown in FIG. 2.
Figure 17:
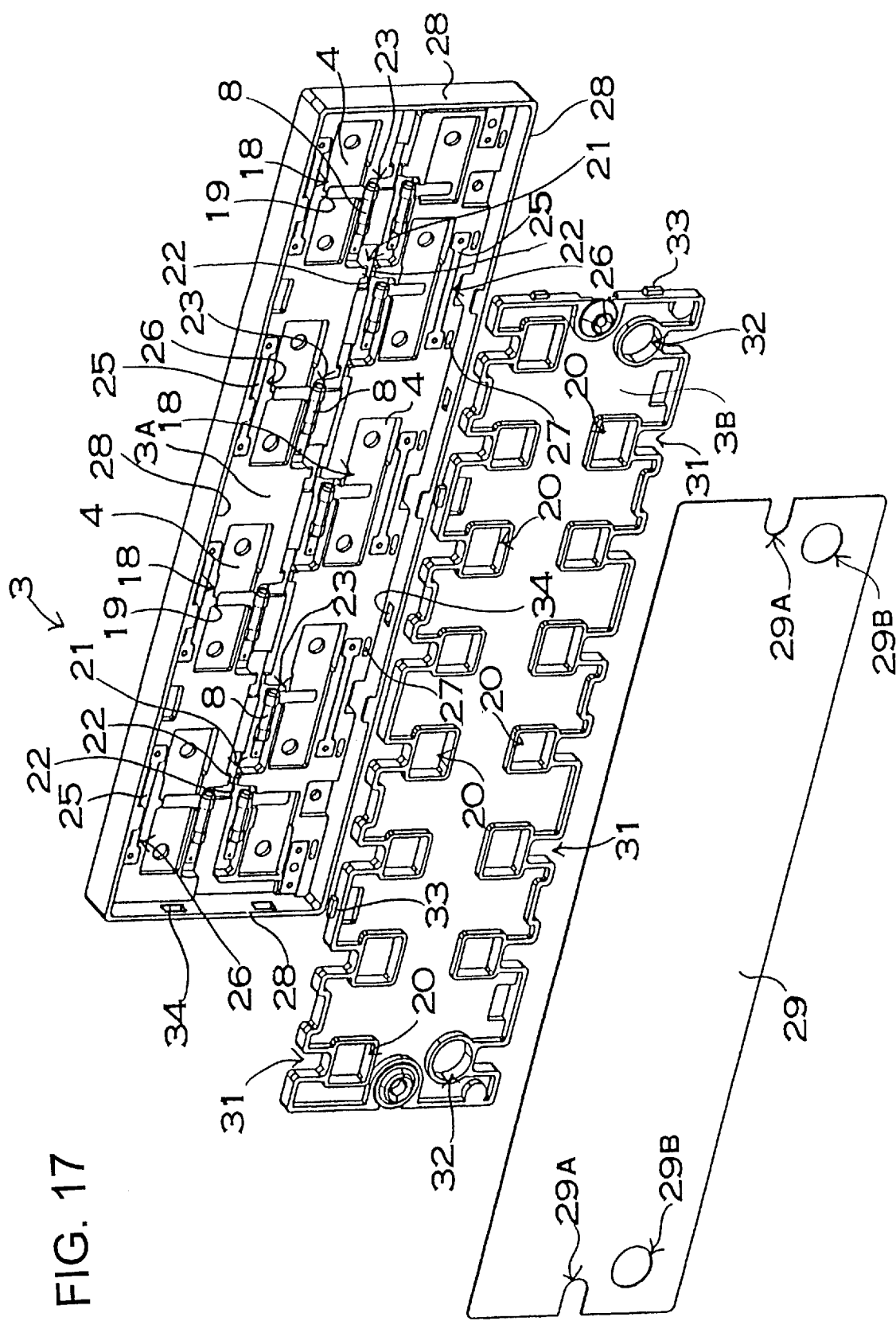
FIG. 17 is an exploded oblique view showing assembly of the end-plate shown in FIG. 16.

End-plates 3 are fixed to the holder-case 2 retaining power modules 1 in fixed positions in the configuration described above. The end-plates 3 house pass bars 4 which connect the;power modules 1 of the holder-case 2 in series. An end-plate 3 holds pass bars 4 in fixed positions, and, as shown in the exploded oblique views of FIGS. 16 and 17, is provided with a frame section 3A and a cover section 3B which layer together for connection. The frame section 3A and a cover section 90 of an end-plate 3 are formed separately, both of single-piece plastic construction. The frame section 3A is disposed on the side facing the power modules 1, and the cover section 3B is disposed on the backside of the frame section 3A.

The frame section 3A has pass bars 4 disposed on its backside, which connect the power modules 1 in series. Pass bars 4 disposed here are sandwiched between the frame section 3A and a cover section 3B for retention in fixed positions on an end-plate 3.

Figure 18:
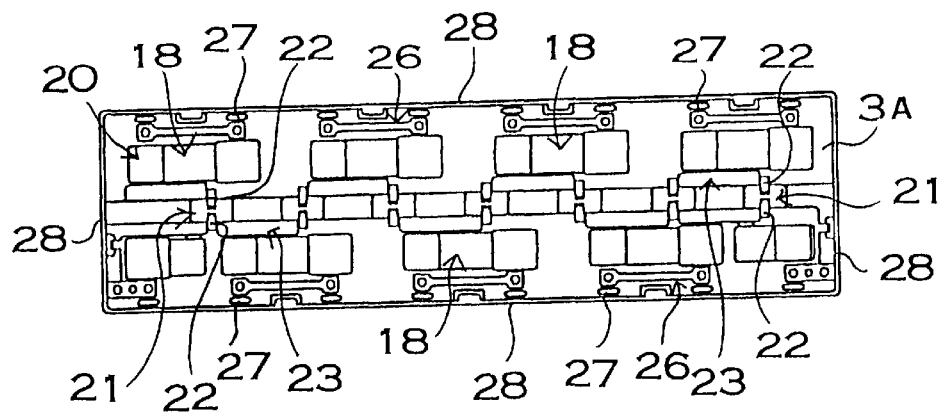
FIG. 18 is a plan view showing assembly of the frame of the end-plate shown in FIG. 16.
Figure 19:
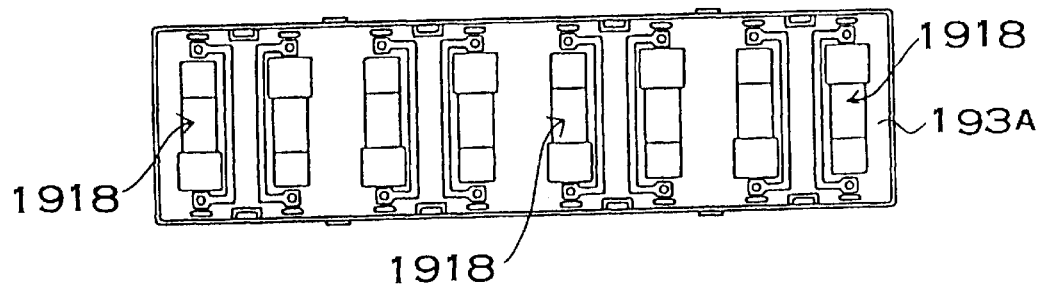
FIG. 19 is a plan view showing another example of an end-plate frame.
Figure 20:
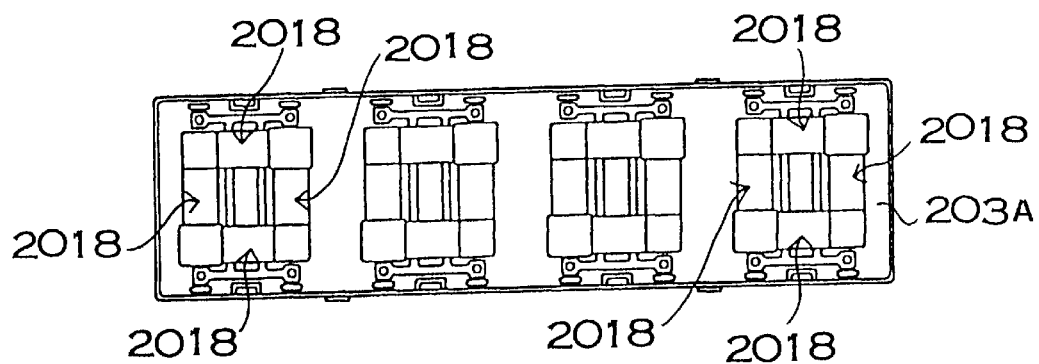
FIG. 20 is a plan view showing another example of an end-plate frame.

The frame section 3A shown in the figures has pass bar insertion cavities 18 formed on its backside to hold pass bars 4 in fixed positions. A pass bar insertion cavity 18 Is approximately the same size as a rectangular pass bar 4 outline to allow insertion of a metal plate pass bar 4, but more precisely, the insertion cavity 18 is a slightly larger rectangle. The frame sections 3A shown in the oblique views of FIGS. 16 and 17 and in FIG. 18 are provided with pass bar insertion cavities 18 which extend in the lateral direction. In this patent application, pass bar 4 lateral direction is taken to be the lengthwise direction of the pass bar 4, and the direction perpendicular to this is taken to be the vertical direction. The frame section 193A shown in FIG. 19 is provided with pass bar insertion cavities 1918 which extend in the vertical direction. The frame section 203A shown in FIG. 20 is provided with pass bar insertion cavities 2018 in both the vertical and lateral directions. Pass bars are inserted into the pass bar insertion cavities 1910 and 2018 to connect power modules in series.

Stopper clasps 19 are provided at pass bar insertion cavity 18 openings to prevent pass bars 4 from falling out of the cavities, and are formed of single-piece construction with a frame section 3A. Stopper clasps 19 project from the inside surface of pass bar insertion cavity 18 openings. Stopper clasps 19 shown in the figures project from the inside surface, approximately at the middle of long side of the pass bar insertion cavity 18 openings. If stopper clasp 19 projection height is too tall, it is difficult for pass bars 4 to fall out of pass bar insertion cavities 18, but pass bar 4 insertion into pass bar insertion cavities 18 also becomes difficult. Conversely, if stopper clasps 19 are short, pass bars 4 are easy to insert into pass bar insertion cavities 18, but pass bars 4 also easily fall out of pass bar insertion cavities 18. Stopper clasps 19 are provided at a projection height. from pass bar insertion cavity 18 openings that allows smooth pass bar 4 insertion into pass bar insertion cavities 18 and effectively prevents pass bars,4 from failing out of pass bar insertion cavities 18.

Figure 21:
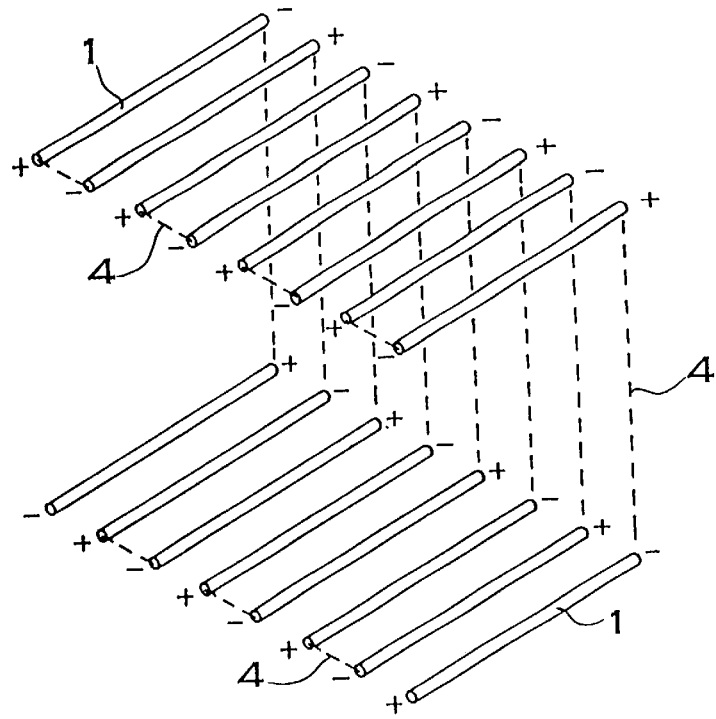
FIG. 21 is an diagrammatic oblique view showing s plurality of power modules connected in series by pass bars.

The holder-case 2 shown in FIG. 2 has two levels vertically and houses 8 power module 1 rows. In this holder-case 2, the end-plate 3 at one end connects power modules 1 in series by housing pass bars 4 laterally, and the end-plate 3 at the other end connects power modules 1 in series by housing pass bars 4 vertically. This connects all power modules 1 in series as shown in FIG. 21. Consequently, the end-plate 3 attached to one end of the holder-case 2 houses pass bars 4 oriented,in the lateral direction as shown in FIGS. 16, 17, and 18, and the end-plate 3 attached to the other end of the holder-case 2 houses pass bars 4 oriented in the vertical direction as shown in FIG. 19. As shown in FIG. 20, a frame section 203A provided with pass bar insertion cavities 2018 in both vertical and lateral directions can be attached to both ends of a holder-case 2.

Frame sections 3A are provided with windows 20 at both ends of pass bar insertion cavities 18 for connecting pass bars 4 with power module 1 electrode terminals 5. The windows 20 are formed in a shape allowing power module 1 electrode terminals 5; fixed to battery 6 electrodes to fit in the windows without rotation. The power modules 1 shown in the figures have square electrode terminals 5 fixed to both ends. Windows 20 to fit these electrode terminals 5 are approximately the same size as the outline of the electrode terminals 5, but more precisely are formed with inside shapes slightly larger than the electrode terminals 5. In this type of frame section 3A, power module 1 electrode terminals 5 insert into windows 20 to retain the power modules 1 without rotation and allow pass bar 4 connection.

Frame sections 3A shown in the figures are provided with lead wire grooves 21 to hold lead wires in fixed positions. Lead wire grooves 21 are provided parallel to pass bar insertion cavities 18. Stopper clasps 22 are also provided in the openings of the lead wire grooves 21 to prevent the lead wires from falling out. Stopper clasps 22 are located on opposing sides of the openings of the lead wire grooves 21. Gaps between opposing stopper clasps 22 are made approximately equal to the lead wire thickness. These stopper clasps 22 allow lead wires to be easily inserted into lead wire grooves 21, but makes it difficult for lead wires to fall out of lead wire grooves 21.

Lead wires are connected to pass bars 4 via fuses 8 for measurement of the voltage of each power module 1. Frame sections 3A are provided with fuse cavities 23 to retain fuses 8 in fixed positions. The fuse cavities 23 are made to connect with lead wire grooves 21. Cut-outs 24 are provided in the partitions between fuse cavities 23 and Pass bar insertion cavities 18 to run lead plates connecting fuses 8 and pass bars 4.

Frame sections 3A shown in FIGS. 16 and 17 are also provided with sensor connecting plate insertion cavities 26 on their backside to hold sensor connecting plates 25 in fixed positions. Sensor connecting plate insertion cavities 26 are adjacent and parallel to pass bar insertion cavities 18 and on the outside of pass bar insertion cavities 18. Sensor connecting plates 25, which insert into sensor connecting plate insertion cavities 26, connect temperature sensors 13, fixed to power modules 1, in series. It is preferable for sensor connecting plate insertion cavities 26 to also have stopper clasps similar to pass bar insertion cavities 18, formed of single-piece construction in the openings, to prevent sensor connecting plates 25 from falling out. As shown in FIG. 2, sensor leads 14 project out from power modules 1 adjacent to electrode terminals 5. These sensor leads 14 connect with sensor connecting plates 25 to connect all temperature sensors 13 in series.

Frame sections 3A are provided with connecting holes 27 to allow passage of sensor leads 14 through the frame section 3A for connection with sensor connecting plates 25. Connecting holes 27 are opened adjacent to one end of each sensor connecting plate insertion cavity 26 and outboard of those insertion cavities 26. Sensor leads 14 projecting from power modules 1 pass through frame section 3A connecting holes 27, connect with sensor connecting plates 25, and connect all temperature sensors 13 in series. All temperature sensors 13, mutually connected in series, output their measurement signals to external devices via lead wires. If any temperature sensor 13 detects that battery temperature has risen abnormally high, a signal issued from that temperature sensor 13 is processed by an externally connected device such as a protection circuit. For example, an external protection circuit limits, or cuts-off battery 6 charge-discharge current to protect the batteries 6.

Frame sections 3A are provided with periphery walls 28 established around the periphery of a frame section 3A and projecting from its backside to hold a cover section 3B in a fixed position. A frame section 3A with periphery walls 28 can be layered with a cover section 3B to accurately fix the position of the cover section 3B with no slippage out of alignment. Further, both a cover section 3B and a water resistant cover 29 can be layered in fixed positions inside the periphery walls 28 for attachment to a frame section 3A. A configuration which connects and fixes the outside periphery of the water resistant cover 29 to the inside surface of the periphery walls 28 in a water resistant fashion has the characteristic that the end-plate 3 can be a reliable water resistant structure.

A cover section 3B is layered on, and fixed to a frame section 3A sealing open regions of pass bar insertion cavities 18, sensor connecting plate insertion cavities 26, and lead wire grooves 21. In this configuration the frame section 3A and cover section to sandwich the pass bars 4, sensor connecting plates 25, and lead wires to retain them in fixed positions. With the cover section 3B connected and fixed to the frame section 3A, the pass bars 4, sensor connecting plates 25, and lead wires are set in fixed positions and do not fall outside the end-plate 3. The outline of a cover section 3B is made approximately equal to the shape of the inside surface of the periphery walls 28 provided on a frame section 3A. A cover section 3B fits into the periphery walls 28 of a frame section 3A to fix its position and form a layered end-plate 3.

The cover section 3B shown in FIGS. 16 and 17 has windows 20 opened in the same positions as windows 20 provided through the frame section 3A. In this end-plate 3, windows 20 are opened in corresponding locations through both the frame section 3A and the cover section 3B, and pass bars 4 housed within the end-plate 3 can be connected with power module 1 electrode terminals 5 via setscrews.

The cover section 3B is provided with cut-outs 31 in its periphery to connect power module 1 sensor leads 14 to sensor connecting plates 25. The cut-outs 31 are disposed outward of the windows 20. In addition, the cover section 3B is provided with projections, formed of single-piece construction, around the periphery and window 20 edges. These projections not only reinforce the cover section 3B but also effectively prevent water or other fluid ingress through windows 20 or cut-outs 31 into the inside of the end-plate 3.

The cover section 3B shown in FIGS. 16 and 17 has lead extraction openings 32A at both ends to extract lead wires from the end-plate 3, Lead wires set in lead wire grooves 21 are available externally from the extraction openings 32A.

Figure 22:
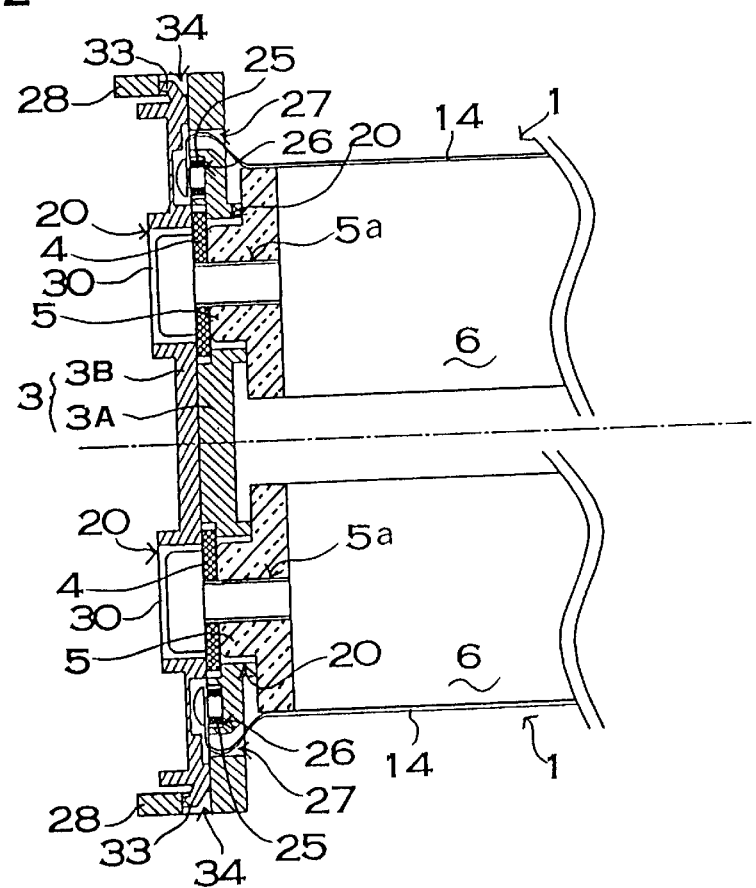
FIG. 22 is a cross-section view showing end-plate pass bar and power module connecting structure.

Stopper projections 33 of single-piece construction are provided on the periphery edge of the cover section 3B to allow insertion and connection of the cover section 3B into the periphery walls 28 of the frame section 3A. The cover section 3B shown in FIGS. 16 and 17 is formed in an overall rectangular shape with a plurality of stopper projections 33 protruding from each edge. Stopper depressions 34 are provided on the inside surface of the periphery walls 28 of the frame section 3A to mate with stopper projections 33. As shown in FIG. 22, stopper depressions 34 may also be through-holes provided in the periphery walls 28. As shown in FIG. 22, the cover section 3B is connected in a fixed position to the frame section 3A by fitting stopper projections 33 into stopper depressions 34. In the end-plate 3 of these figures, stopper projections 33 are provided in the cover section 3B and stopper depressions 34 are provided in the frame section 3A, but stopper projections 33 may be provided in the frame section 3A and stopper depressions 34 provided in the cover section 3B to also connect the cover section in a fixed position on the frame section. Further, stopper projections may be provided only on the inside edges of periphery walls of the frame section, and the cover section can be pushed in beyond these stopper projections to join the cover section to the frame section.

This type of snap-insertion structure described above has the characteristic that the end-plate 3 cover section 3B and frame section 3A can be simply, easily, and quickly connected and disconnected. However, the cover section may also be corrected with the frame section by a configuration including spot welds, local bonding, or screw connection, etc.

The water resistant cover 29, which is layered onto the outside surface of the cover section 3B, is a plastic plate, has an outline shape approximately equal to the shape of the inside of the periphery walls 28 of the frame section 3A, and has lead wire extraction cut-outs 29A and power cord access holes 29B opened through it.

An end-plate 3 with the structure described above has a cover section 3B fixed to the backside of a frame section 3A with pass bars 4, sensor connecting plates 25, and fuses 8 disposed in specified positions on the frame section 3A. In this state, end-plates 3 are attached to a holder-case 2 holding power modules 1 in fixed positions. As shown in FIG. 22, setscrews 30 are inserted in cover section 3B windows 20 to connect end-plate 3 pass bars 4 to power module 1 electrode terminals 5. With the end-plates 3 connected to the holder-case 2, pass bars 4 car be simply and efficiently connected with electrode terminals 5. However, end-plates 3 may also be connected and fixed to the holder-case 2 after connection of pass bars 4 with power module 1 electrode terminals 5.

The power source embodiment describe above has a single intermediate-casing 2B disposed between cover-casings 2A, and 8 rows of power modules are retained on both sides of the intermediate-casing 2B. However, in the power source of the present invention, the number of intermediate-casings between cover-casings can be changed to change the number of power modules housed. For example, a power source with two intermediate-casings between cover-casings can house 3 levels of 8 rows of power modules. The power source may have 2 or more intermediate-casings between cover-casings to further change the number of power modules that can be housed.

Consequently the power source of the present invention has the characteristic that the number of power modules housed can be changed extremely easily in various ways depending on the application primarily by changing the number of intermediate-casings, and cover-casings and intermediate-casings of single-piece construction can be used.

The power source described above has temperature sensors fixed to power modules. Temperature sensors may also be attached to the holder-case for positioning on power module surfaces. A holder-case with temperature sensors and power modules attached is shown in the exploded oblique view of FIG. 23. In addition, an oblique view of a holder-case with power modules in place is shown in FIG. 24. In FIG. 24, temperature sensors 2313 are disposed on the surfaces of power modules 231, but are not fixed to the surfaces of the power modules 231. As shown in FIG. 24, temperature sensors 2313 are mounted on the holder-case 232, and disposed on the surfaces of the power modules 231.

Figure 23:
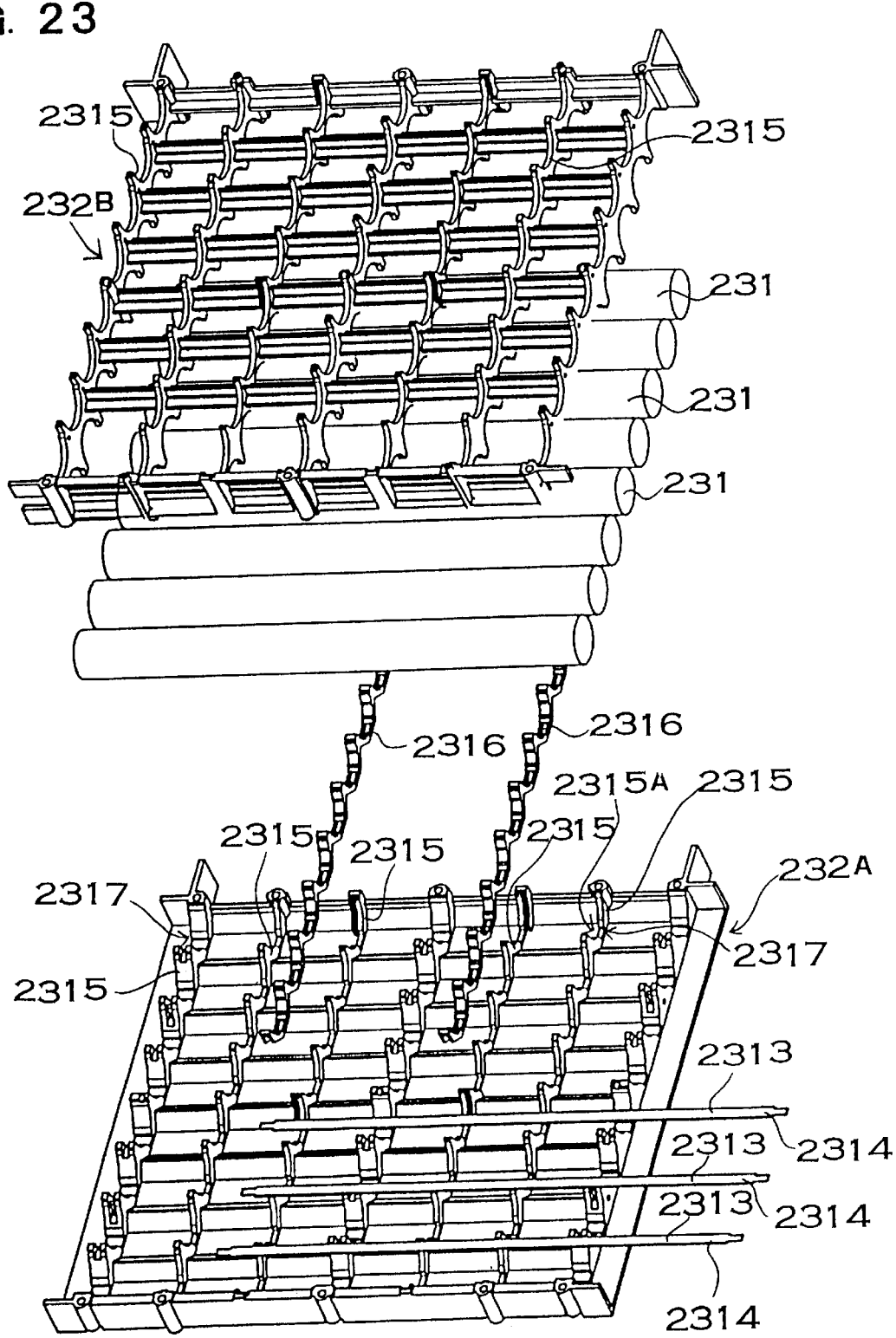
FIG. 23 is an exploded oblique view showing a portion of a holder-case of another embodiment of the power source of the present invention.
Figure 24:
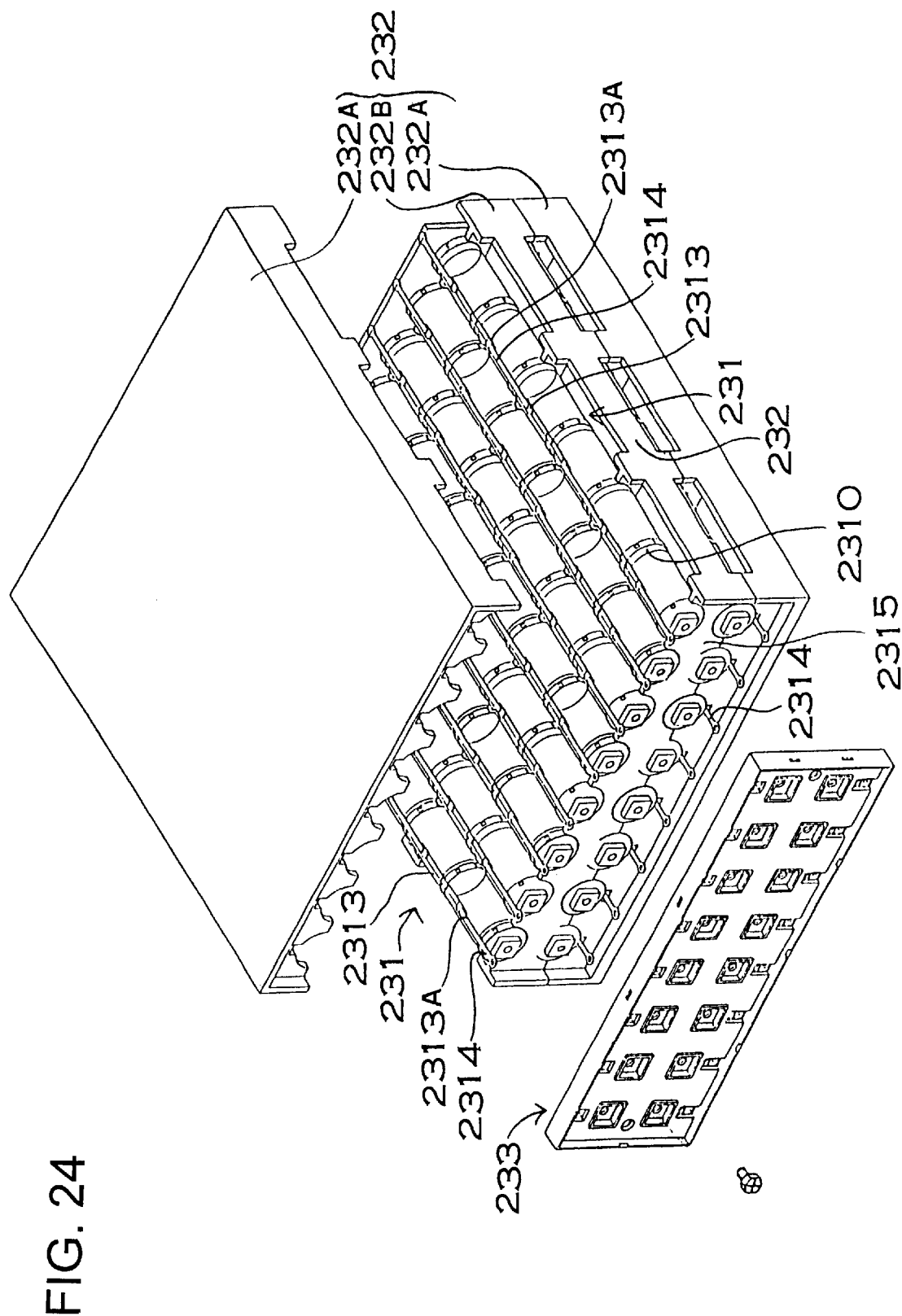
FIG. 24 is an exploded oblique view showing a holder-case of another embodiment of the power source of the present invention.

In the exploded oblique view of FIG. 23, the cover-casing 232A and intermediate-casing 232B have holder ribs 2315, formed of single-piece construction, to sandwich and retain power modules 231 and temperature sensors 2313. The cover-casing 232A and intermediate-casing 232B shown in FIG. 23 are provided with a plurality of parallel rows of holder ribs 2315 at both ends and intermediate locations.

Figure 25:
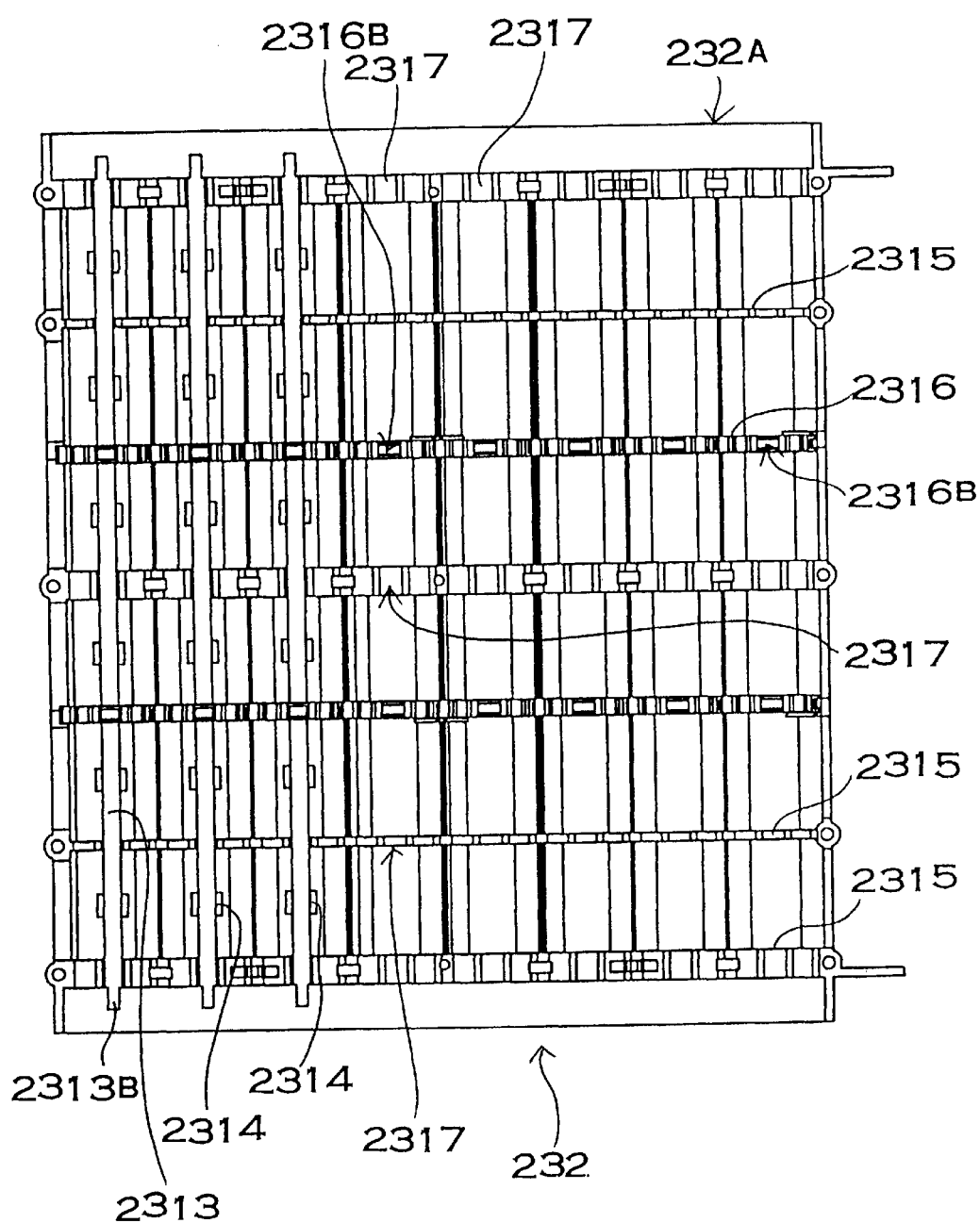
FIG. 25 is a plan view of the cover-casing shown in FIG. 23.
Figure 26:
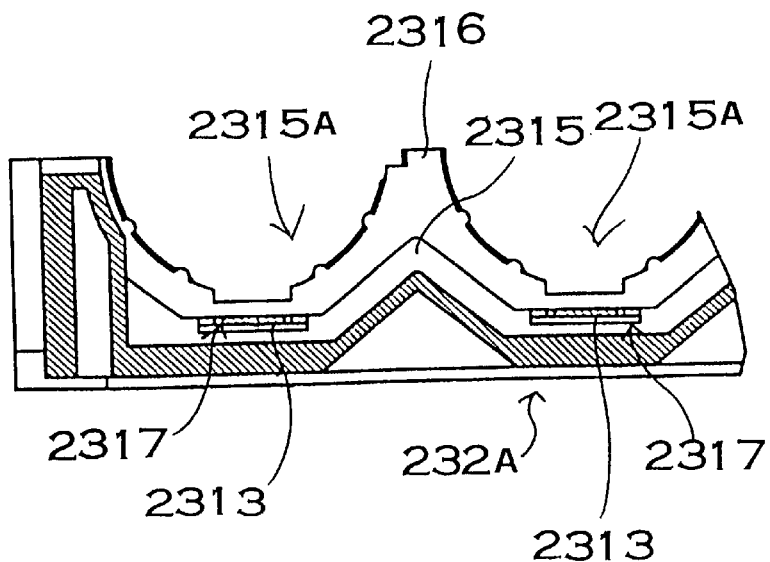
FIG. 26 is a partial cross-section view of the cover-casing shown in FIG. 25.

As shown in FIGS. 23 and 25, temperature sensors 2313 are mounted in the holder-case 232 in a direction perpendicular to holder ribs 2315. Although these and other figures show temperature sensors 2313 mounted in only a portion of the holder-case 232 temperature sensors 2313 are attached at every location housing a power module 231. As shown in the cross-section view of FIG. 26, holder ribs 2315, formed of single-piece construction with the holder-case 232, are provided with cut-outs 2317 in a part of each retaining cavity 2315A for attachment of,temperature sensors 2313. The holder rib 2315 of FIG. 26 is provided with a cut-outs 2317 at the bottom of the retaining cavities 2315A. Temperature sensors 2313 are inserted into cut-outs 2317 in the holder ribs 2315, power modules 231 are inserted into retaining cavities 2315A, and temperature sensors 2313 and power modules 231 are sandwiched by the holder ribs 2315. The cut-outs 2317 are made to a size which allows insertion of the temperature sensors 2313 and retention without movement.

The temperature sensors 2313 are devices that can measure the temperature of power module 231. Temperature sensors 2313 comprise devices 2313A, which sense temperature by changing electrical resistance with temperature, and which are connected in a straight-line fashion with sensor leads 2314. The temperature sensors 2313 shown in the figures use PTC devices as the temperature sensing devices 2313A. However, any device which can detect power module temperature can be used. For example, thermistors may be used in place of PTC devices.

Temperature sensing devices 2313A are connected in series via sensor leads 2314. Temperature sensors with series connected temperature sensing devices and all temperature sensors connected in series can determine if any power module temperature hat risen abnormally high. Temperature sensors to detect the temperature of a power module, which has a plurality of batteries connected in series, have a plurality of temperature sensing devices connected in series and in contact with each battery. Each temperature sensing device is connected it, a position contacting the surface of each battery of a power module. However, a single temperature sensing device may also detect the temperature of a single power module, or a power module may be divided into a plurality of blocks and the temperature of each block may be detected by a temperature sensing device.

Temperature sensing devices such as PTC devices, which increase resistance with temperature, can detect abnormal power module temperature rise by series connection of a plurality of devices. Temperature sensing devices such as thermistors, which decrease resistance with temperature, can detect abnormal power module temperature rise by parallel connection of a plurality of devices. Temperature sensors with a plurality of temperature sensing devices connected in series or parallel can determine if a plurality of temperature sensing devices has detected an abnormally high temperature via a single pair of leads. However, this type of temperature sensor cannot determine which power module or battery became abnormally high in temperature. Nevertheless, temperature sensors, which cannot specify which power module has abnormal temperature, can be effectively used. This is because regardless of which power module temperature became abnormally high, current is regulated lower to protect all power modules. Sensor leads may also be connected to a plurality of temperature sensing devices, and each sensor lead can be routed external to the holder-case to detect power module temperature.

As shown in FIGS. 25 and 26, temperature sensors 2313 are inserted into cut-outs 2317 in the holder ribs 2315 and set in fixed positions in the holder-case 232. Shock-absorbing gaskets 2316 are attached to holder ribs 2315, and the temperature sensors 2313 of these figures are mounted between these shock-absorbing gaskets 2316 and the cut-outs 2317. In this configuration of holder-case 232, temperature sensors 2313 can be attached, without falling out, in holder ribs 2315 via shock-absorbing gaskets 2316. Although not illustrated, temperature sensors can also be mounted between the shock-absorbing gaskets and power modules. This configuration of temperature sensors has the characteristic that temperature sensors are put in even closer proximity with power module surfaces.

Figure 27:
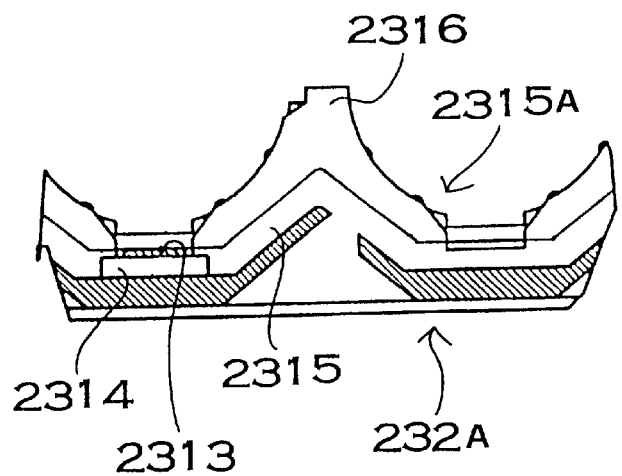
FIG. 27 is a partial cross-section view of the cover-casing shown in FIG. 25.

In the holder-case 232 shown in FIGS. 25 and 27, temperature sensors 2313 have flexible material 2314 which flexibly pushes the temperature sensors 2313 towards power module 231 surfaces. Flexible material 2314 is fixed to regions provided with temperature sensing devices 2313A between holder ribs 2315. In this configuration of holder-case 232, temperature sensing devices 2313A can closely contact power module 231 surfaces as a result of the flexible material 2314.

Holder ribs 2315, with temperature sensors 2313 installed, and retaining cavities 2315A, with power modules 231 inserted, retain the temperature sensors and power modules in fixed positions by sandwiching them.

Shock-absorbing gaskets 2316 are formed narrow and resiliently deformable in regions which attach at holder rib 2315 cut-outs 2317. This is because the shock-absorbing gaskets 2316 press against power module 231 projections disposed in cut-outs 2317, and retain them in a stable fashion. The shock-absorbing gaskets 2316 shown in the figures are provided with slits 2316B in regions corresponding to holder rib 2315 cut-outs 2317, and these regions are formed narrow and resiliently deformable. The slits 2316B connect with attachment grooves and material located on both sides of a slit 2316B is disposed in the manner of bridges across the cut-out 2317.

Figure 28:
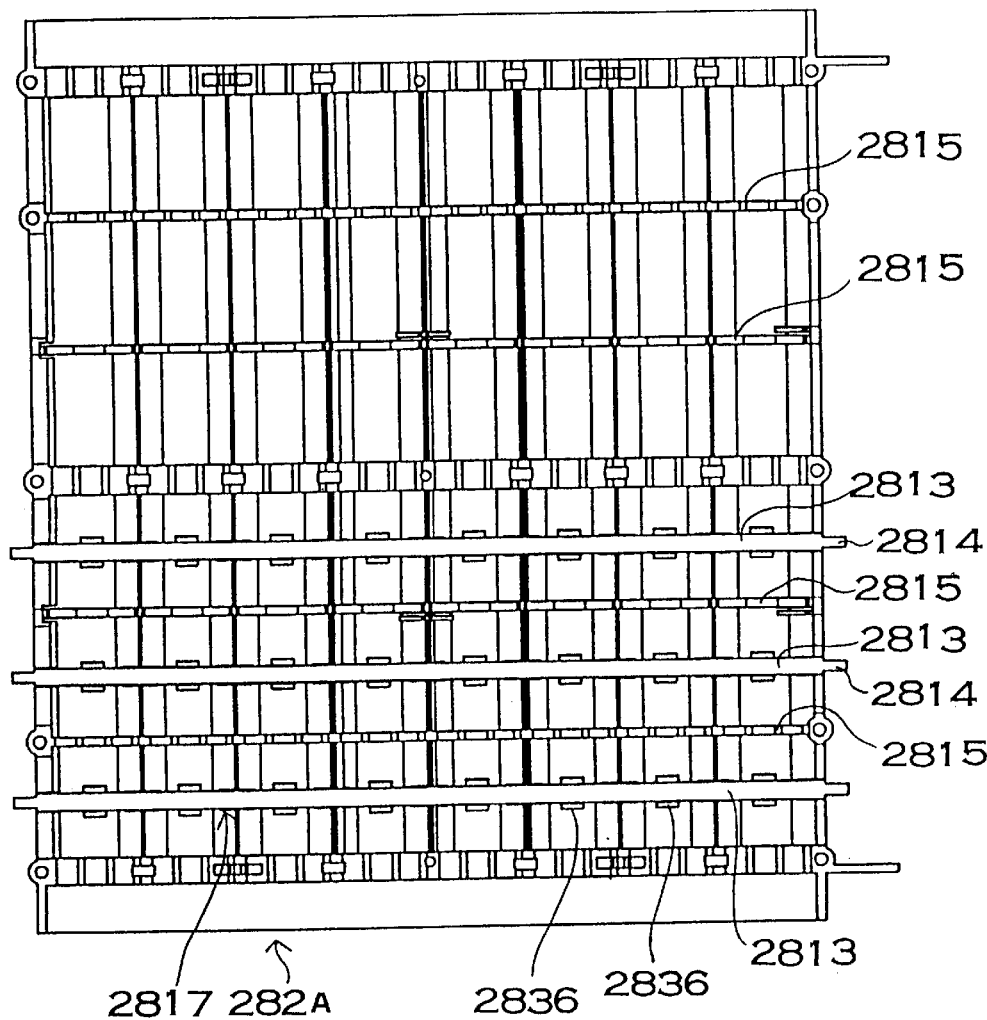
FIG. 28 is a plan view of a cover-casing of another embodiment of the power source of the present invention.

In the type of power source described above, temperature sensors 2313 are arranged in a direction perpendicular to the holder ribs 2315. As shown in the plan view of FIG. 28 and the cross-section view of FIG. 29, temperature sensors may also be arranged parallel to the holder ribs 2815. FIG. 28 shows a plan view of a cover-casing 282A, and temperature sensors 2813 are mounted between and parallel to the holder ribs 2815 of the cover-casing 282A. Temperature sensors 2813 are fixed to the cover-casing 282A via flexible material 2836. Double sided adhesive tape is attached to both sides of the flexible material 2836. The double-sided tape attaches temperature sensors 2813 to the cover-casing 2824 via the flexible material 2836. In addition, temperature sensors 2813 insert into cut-outs 2817 provided in the cover-casing 282A to mount in fixed positions. The cover-casing 282A is formed with projections 282a which jut out between power modules 281, and the cut-outs 2817 are provided in these projections 282a. The cut-outs 2817 attach the temperature sensors 2813 in precise locations. A structure, which inserts temperature sensors 2813 into cut-outs 2817 and attaches them with double sided adhesive tape or adhesive bond, has the characteristic that temperature sensors 2813 can be mounted in precise positions and retained in those positions without falling out. However, in the power source of the present invention, it is not always necessary to fix the position of temperature sensors with double sided adhesive tape or adhesive bond. This is because power modules mounted in the holder-case press against, and hold the temperature sensors in position without allowing their movement.

Figure 29:
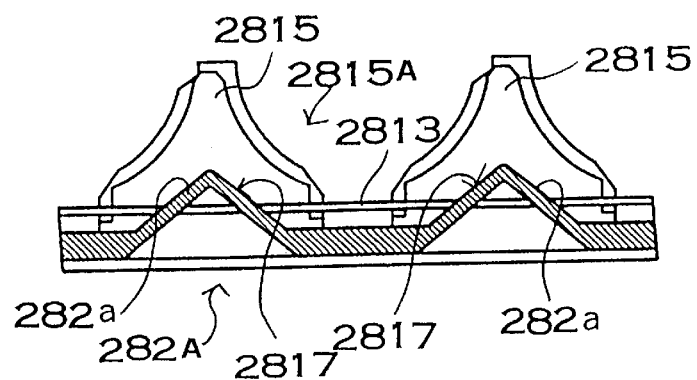
FIG. 29 is a partial cross-section view of the cover-casing shown in FIG. 28.

FIGS. 28 and 29 show temperature sensors 2813 mounted in the cover-casing 282A of a holder-case 282. Temperature sensors may also be mounted in an intermediate-casing, rather than a cover-casing. Temperature sensors are mounted between holder ribs provided in the intermediate-casing. Cut-outs are provided in intermediate-casing rods which connect holder ribs, and temperature sensors are inserted in the cut-outs holding them in fixed positions. Temperature sensors mounted in an intermediate-using are preferably attached to intermediate-casing rods via double sided adhesive tape or adhesive bond. This is to insure temperature sensing devices disposed between intermediate-casing rods are put in close proximity with power module surfaces.

A holder-case with the above structure is assembled as follows to retain is power modules disposed in parallel.

(1) Temperature sensors 231 are installed in cover-casing 232A holder ribs 2315, or temperature sensors 8813 are installed between cover-casing 282A holder ribs 2815. Temperature sensors 2313, 2813 are inserted into, and held in fixed positions by cut-outs 217 provided in holder ribs 2315, or in cut-outs 2817 provided in cover-casing 282A projections 282a.

(2) The bottom cover-casing 232A, 282A is set horizontally and power modules are lined up in a parallel fashion by insertion into holder rib 2315, 2815 retaining cavities 2315A, 2815A. In the cover-casing 232A, 282A of the figures, 8 rows of power modules are arranged in the holder ribs 2315, 2815. Power modules are lined up in holder ribs 2315, 2815 to arrange both ends in single planes.

(3) The intermediate-casing is placed on the bottom cover-casing 232A, 282A. The power modules insert into the retaining cavities of holder ribs projecting from the bottom surface of the intermediate-casing 2B to align the layer.

(4) Power modules are lined up in a parallel fashion by Insertion into retaining cavities in the holder ribs projecting from the upper surface of the intermediate-casing. Again, power modules are lined up to arrange both ends in single planes.

(5) The top cover-casing is placed over the power modules aligning the top layer cover-casing. In this configuration, power modules are guided into the retaining cavities of holder ribs projecting from the bottom side of the cover-casing.

(6) The top and bottom cover-casings are joined with connecting screws to connect and hold the top and bottom cover-casings and intermediate-casing together. Connecting screws pass through the top and bottom cover-casings and intermediate-casing to join them. Connecting screws join the top and bottom cover-casings at the four corner regions and at Intermediate locations.

The assembly process described above installs temperature sensors in the cover-casings. However, temperature sensors may also be connected to intermediate-casing holder ribs to dispose them on power module surfaces. Further, using two-levels of intermediate-casings to house three-levels of power modules, temperature sensors may be mounted in Intermediate-casing holder ribs and in cover-casing holder ribs to dispose temperature sensors on the surfaces of all power modules.

Temperature sensors 2313 attached in a holder-case 232 are connected in series via sensor connecting plates contained in the end-plates 233. Sensor leads are connected to sensor connecting plates to join all temperature sensors 2313 in series. In a holder-case 282 with temperature sensors 2813 attached parallel to holder ribs 2815, as shown in FIG. 28, sensor connecting plates are disposed on surfaces where the sensor leads 2814 project out to connect the sensor leads 2814.

A power source, with temperature sensors attached to the holder-case as described above, has the excellent characteristic that it can be assembled efficiently at low cost. In this type of power source there is no requirement to precisely fix temperature sensors to specific positions on the power modules. Temperature sensors are set in cut-outs provided in holder ribs to assume accurately defined positions. This disposes temperature sensors in positions corresponding to power module surfaces.

In particular, in this type of power source, both the temperature sensors and the power modules can be simply, easily, and efficiently installed in fixed positions within the holder-case. Therefore, this type of power source has the characteristic that temperature sensors, together with power modules can be efficiently loaded in fixed positions within the holder-case. In addition, holder ribs provided in the cover-casings and intermediate-casing sandwich and retain power modules and temperature sensors in fixed positions. Therefore, the power source has the characteristic that it can be efficiently assembled in a configuration that puts temperature sensors in close contact with power module surfaces and does not form gaps between power modules and holder ribs.

Further, in this type of power source, it is not necessary to mount temperature sensors on power modules in precise locations with precise orientations. Temperature sensors can be set in holder rib cut-outs for installation in the proper locations, Therefore, power module manufacturing cost can be considerably reduced. The holder-case can also be formed inexpensively by dividing it into cover-casings and intermediate-casings, and cut-outs are formed in holder ribs to allow temperature sensors to be set in position. Therefore, not only the temperature sensors, but also the holder-case can be inexpensively produced, and the characteristic of considerable overall cost reduction is achieved.

Still Further, this power source uses a holder-case with single-piece construction components, the number of power modules housed can be changed, and a temperature sensor can be disposed on the surface of each power module. This characteristic is realized because the number of layers of intermediate-casing levels can be changed to change the number of power modules and temperature sensors. For example, as shown in the figures, a configuration with one intermediate-casing level between cover-casings allows two levels of power modules to be housed. However, layering two levels of intermediate-casings allows an increased number of power modules with three levels of power modules.

As this invention may be embodied in several forms without departing from the spirit of essential characteristics thereof, the present embodiment is therefore illustrative and not restrictive, since the scope of the invention is defined by the appended claim rather than by the description preceding them, and all changes that fall within the meets and bounds of the claims or equivalence of such meets and bounds thereof are therefore intended to be embraced by the claims.

What is claimed is:

1. A power source provided with a plurality of power modules, said power source comprising:

a holder case retaining said power modules in a parallel arrangement, said holder case comprising a first plastic cover having an inner side, a second plastic cover having an inner side, and a plastic intermediate member having opposite inner sides, said plastic intermediate member being located between said first plastic cover and said second plastic cover;

a plurality of holder ribs integrally formed on said inner side of said first plastic cover, said inner side of said second plastic cover, and said opposite inner sides of said plastic intermediate member, said holder ribs projecting so as to retain at least two of said power modules in a parallel arrangement, each of said holder ribs having an outer edge; and a plurality of shock-absorbing gaskets attached to a corresponding number of said holder ribs, each of said shock-absorbing gaskets comprising an attachment groove extending along a length thereof, wherein an outer edge of each of said corresponding number of said holder ribs is inserted into an attachment groove of one of said shock-absorbing gaskets, thereby attaching said shock-absorbing gaskets to said corresponding number of said holder ribs, wherein said power modules are arranged in a plurality of rows, and wherein at least one of said power modules is retained in a fixed position by said shock-absorbing gaskets that are attached to said holder ribs.

2. A power source as recited in claim 1, wherein said holder ribs are arranged in a plurality of rows, each of said holder ribs is formed in a single-piece construction.

3. A power source as recited in claim 2, wherein said holder case comprises a first end and a second end, and wherein said holder ribs include a holder rib located at said first end of said holder case, a holder rib located at said second end of said holder case and a holder rib located between said first end and said second end of said holder case.

4. A power source as recited in claim 1, wherein the holder case has end-plates attached thereto, each of said end-plates comprising a pass bar connecting at least two of said power modules.

5. A power source as recited in claim 1, wherein at least one of said power modules is arranged between said plastic intermediate member and said first plastic cover, and wherein at least one of said power modules is arranged between said plastic intermediate member and said second plastic cover.

6. A power source as recited in claim 1, wherein at least one of said power modules comprises a straight line of rechargeable batteries.

7. A power source as recited in claim 6, wherein each of said rechargeable batteries is selected from a group consisting of nickel-hydrogen batteries, nickel-cadmium batteries, and lithium-ion batteries.

8. A power source as recited in claim 7, further comprising at least one temperature sensor,
   wherein said at least one temperature sensor is fixed to a surface of one of said rechargeable batteries.

9. A power source as recited in claim 7, further comprising:
   a plurality of temperature sensors; and
   a plurality of temperature sensor leads,
      wherein one of said temperature sensors and one of said temperature sensor leads are fixed to a surface of one of said rechargeable batteries.

10. A power source as recited in claim 7, wherein at least one of said power modules comprises one end having a positive electrode terminal, another end having a negative electrode terminal, and a straight line of electrically connected cylindrical rechargeable batteries,
    wherein said straight line of electrically connected cylindrical rechargeable batteries has a first end and a second end,
    wherein said positive electrode terminal is connected to said first end of said straight line of electrically connected cylindrical rechargeable batteries, and
    wherein said negative electrode terminal is connected to said second end of said straight line of electrically connected cylindrical rechargeable batteries.

11. A power source as recited in claim 1, wherein at least one of said power modules comprises a capacitor.

12. A power source as recited in claim 1, wherein one holder rib comprises a plurality of retaining cavities,
    wherein an outer surface of each of said power modules is similar to outer surfaces of the other power modules, and
    wherein said retaining cavities have shapes that are complementary to said outer surfaces of said power modules, such that said retaining cavities retain a corresponding number of said power modules in fixed positions.

13. A power source as recited in claim 1, further comprising a plurality of shock-absorbing gaskets, each of said gaskets being attached to one of a first number of said holder ribs,
    wherein a second number of said holder ribs, without shock-absorbing gaskets attached thereto, project higher than said first number of said holder ribs with shock-absorbing gaskets attached thereto,
    wherein an outer edge of each of said second number of said holder ribs, are in contact, or are in close proximity to, one of a corresponding number of said power modules.

14. A power source as recited in claim 1, wherein each of said holder ribs comprises a number of retaining cavities capable of accommodating and retaining a corresponding number of said power modules in a parallel arrangement,
    wherein said outer edges of said holder ribs are formed in a first wave-shape having peaks and valleys,
    wherein each of said shock-absorbing gaskets is formed in a second wave-shape along a length thereof, and
    wherein said second wave-shape is complementary with respect to said first wave-shape such that said shock-absorbing gaskets are attachable to said outer edges of said retaining cavities along said length thereof, respectively.

15. A power source as recited in claim 1, wherein an outer surface of each power module comprises a projection,
    wherein said holder ribs comprise a plurality of bases and a plurality of cut-outs such that each base has one of said cut-outs located therein, and
    wherein one of said projections are disposed within one of said cut-outs.

16. A power source as recited in claim 15, wherein each of said shock-absorbing gaskets comprises a plurality of resiliently deformable portions located along said length thereof such that said resiliently deformable portions are adjacent to said cut-outs, respectively.

17. A power source as recited in claim 16, wherein each of said resiliently deformable portions further comprises a slit.

18. A power source as recited in claim 1, wherein each shock-absorbing gasket comprises at least one projection for contacting and pressing against an outer surface of at least one of said power modules.

19. A power source as recited in claim 1, further comprising a plurality of temperature sensors selected from a group consisting of A, B and C,
    wherein A comprises a plurality of temperature sensors mounted in said first plastic cover, said second plastic cover and said plastic intermediate member,
    wherein B comprises a plurality of temperature sensors mounted in said first plastic cover and said second plastic cover,
    wherein C comprises a plurality of temperature sensors mounted in said plastic intermediate member, and
    wherein said temperature sensors are positioned on outer surfaces of said power modules.

20. A power source as recited in claim 19, wherein said temperature sensors are disposed so as to be parallel with said holder ribs.

21. A power source as recited in claim 20, wherein each of said holder ribs comprises a plurality of retaining cavities,
    wherein each of said retaining cavities comprises a cut-out,
    wherein a power module of said power modules is disposed in at least one of said retaining cavities, and
    wherein at least one of said temperature sensors is disposed in one of said cut-outs.

22. A power source as recited in claim 21, wherein said holder ribs are disposed in rows, said retaining cavities and said cut-outs are disposed in columns, and
    wherein said rows of said holder ribs are perpendicular to said columns of said retaining cavities and said cut-outs.

23. A power source as recited in claim 19, wherein said holder ribs are arranged in rows on each of said first plastic cover, said second plastic cover and said intermediate member,
    wherein each of said first plastic cover, said second plastic cover and said intermediate member further comprises cut-outs disposed so as to separate each of said holder ribs, and
    wherein said temperature sensors are disposed in said cut-outs.

24. A power source as recited in claim 19, wherein said holder ribs are arranged in rows on each of said first plastic cover, said second plastic cover and said intermediate member, wherein each of said first plastic cover and said second plastic cover further comprises cut-outs disposed so as to separate each of said holder ribs, and wherein said temperature sensors are disposed in said cut-outs.

25. A power source as recited in claim 19, wherein said holder ribs are arranged in rows on each of said first plastic cover, said second plastic cover and said intermediate member, wherein said intermediate member further comprises cut-outs disposed so as to separate each of said holder ribs, and wherein said temperature sensors are disposed in said cut-outs.

26. A power source as recited in claim 19, wherein each temperature sensor comprises at least two temperature sensing devices and a sensor lead, wherein said temperature sensing devices of each temperature sensor are joined together in a straight-line configuration by said sensor lead of each temperature sensor.

27. A power source as recited in claim 26, wherein at least one of said temperature sensing devices is a PTC device.

28. A power source as recited in claim 26, wherein said power module comprise a plurality of rechargeable batteries connected in series, and wherein at least one of said temperature sensors is disposed on each of said rechargeable batteries.

29. A power source as recited in claim 28, wherein said holder ribs comprise a plurality of bases and a plurality of cut-outs such that each base has one of said cut-outs located therein, and wherein each of said shock-absorbing gaskets comprises a plurality of resiliently deformable portions located along said length thereof such that said resiliently deformable portions are adjacent to said cut-outs, respectively.

30. A power source as recited in claim 19, wherein said temperature sensors are disposed between said shock-absorbing gaskets and said power modules.

31. A power source as recited in claim 19, further comprising flexible material disposed in said holder case, said flexible material flexibly pushes said temperature sensors towards said power modules.

32. A power source as recited in claim 1, further comprising a plurality of temperature sensors mounted in said first plastic cover, said second plastic cover and said plastic intermediate member, wherein said temperature sensors are positioned on outer surfaces of said power modules, wherein said holder ribs comprise a plurality of bases and a plurality of cut-outs such that each base has one of said cut-outs located therein, and wherein said temperature sensors are disposed between said cut-outs and said shock-absorbing gaskets.

33. A power source as recited in claim 1, further comprising a plurality of temperature sensors mounted in said first plastic cover and said second plastic cover, wherein said temperature sensors are positioned on outer surfaces of said power modules, wherein said holder ribs comprise a plurality of bases and a plurality of cut-outs such that each base has one of said cut-outs located therein, and wherein said temperature sensors are disposed between said cut-outs and said shock-absorbing gaskets.

34. A power source as recited in claim 1, further comprising a plurality of temperature sensors mounted in said plastic intermediate member, wherein said temperature sensors are positioned on outer surfaces of said power modules, wherein said holder ribs comprise a plurality of bases and a plurality of cut-outs such that each base has one kof said cut-outs located therein, and wherein said temperature sensors are disposed between said cut-outs and said shock-absorbing gaskets.

35. A power source case for use with a plurality of power modules, said power source case comprising:

a first cover having an inner side, a second cover having an inner side, and an intermediate member having opposite inner sides, said intermediate member being located between said first cover and said second cover;

at least one of said inner side of said first cover, said inner side of said second cover, said inner sides of said intermediate member comprises at least one holder rib integrally formed thereon, said at least one holder rib having an outer edge and projecting so as to retain at least two of the power modules in a parallel arrangement; and at least one shock-absorbing gasket comprising an attachment groove extending along a length thereof, wherein an outer edge of said at least one holder rib is inserted into said attachment groove thereby attaching said at least one shock-absorbing gasket to said at least one holder rib.

36. A power source case for use with a plurality of power modules, said power source case comprising:

a first cover having an inner side and a second cover having a inner side;

at least one of said inner side of said first cover and said inner side of said second cover comprises at least one holder rib integrally formed thereon, said at least one holder rib having an outer edge and projecting so as to retain at least two of the power modules in a parallel arrangement; and at least one shock-absorbing gasket comprising an attachment groove extending along a length thereof, wherein an outer edge of said at least one holder rib is inserted into said attachment groove thereby attaching said at least one shock-absorbing gasket to said at least one holder rib.

* * * * *